US009094173B2

(12) United States Patent
Prakash et al.

(10) Patent No.: US 9,094,173 B2
(45) Date of Patent: Jul. 28, 2015

(54) RECOVERY FROM HANDOFF ERROR DUE TO FALSE DETECTION OF HANDOFF COMPLETION SIGNAL AT ACCESS TERMINAL

(75) Inventors: Rajat Prakash, La Jolla, CA (US); Aamod Khandekar, San Diego, CA (US); Alexei Gorokhov, San Diego, CA (US); Mohammad J. Borran (Jaber), San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1834 days.

(21) Appl. No.: 12/144,969

(22) Filed: Jun. 24, 2008

(65) Prior Publication Data

US 2009/0029706 A1 Jan. 29, 2009

Related U.S. Application Data

(60) Provisional application No. 60/946,128, filed on Jun. 25, 2007.

(51) Int. Cl.
*H04W 4/00* (2009.01)
*H04L 1/00* (2006.01)
(Continued)

(52) U.S. Cl.
CPC ......... *H04L 1/0061* (2013.01); *H04W 36/0055* (2013.01); *H04L 1/1671* (2013.01); *H04L 1/1829* (2013.01); *H04W 28/04* (2013.01)

(58) Field of Classification Search
CPC ........................... H04W 36/00; H04W 36/0005
USPC .................................. 455/436; 370/321, 331
See application file for complete search history.

(56) References Cited

U.S. PATENT DOCUMENTS 4,833,701 A 5/1989 Comroe et al.
5,117,502 A 5/1992 Onoda et al.
(Continued)

FOREIGN PATENT DOCUMENTS

AU 2002353616 5/2003
CL 36022006 6/2007
(Continued)

OTHER PUBLICATIONS

International Search Report—PCT/US2008/068245—International Search Authority—European Patent Office—Dec. 16, 2008.
(Continued)

*Primary Examiner* — Derrick Ferris
*Assistant Examiner* — Majid Esmaeilian

(57) ABSTRACT

Systems and methodologies are described that facilitate recovering from error due to false detection of completion signals at an access terminal. An access terminal specific request signal can be sent to a target base station to initiate handoff or semi-connected state exit. A completion signal can be transferred in response to the access terminal specific request signal. To mitigate errors stemming from false detection of the completion signal at the access terminal, forward link and reverse link confirmation signals can be transferred to confirm successful handoff or connected state re-entry completion. For example, the access terminal can determine handoff or re-entry to be successful when a forward link confirmation signal is detected prior to expiration of a timer. Moreover, the forward link and reverse link confirmation signals can each include more CRC bits as compared to a number of CRC bits included in the completion signal.

82 Claims, 14 Drawing Sheets

(51) Int. Cl.
  *H04W 36/00*  (2009.01)
  *H04L 1/16*   (2006.01)
  *H04L 1/18*   (2006.01)
  *H04W 28/04*  (2009.01)

(56) References Cited

U.S. PATENT DOCUMENTS

| | | |
|---|---|---|
| 5,128,938 A | 7/1992 | Borras |
| 5,200,952 A | 4/1993 | Bernstein et al. |
| 5,208,837 A | 5/1993 | Richey |
| 5,229,992 A | 7/1993 | Jurkevich et al. |
| 5,247,516 A | 9/1993 | Bernstein et al. |
| 5,251,209 A | 10/1993 | Jurkevich et al. |
| 5,267,261 A | 11/1993 | Blakeney, II et al. |
| 5,268,933 A | 12/1993 | Averbuch |
| 5,388,102 A | 2/1995 | Griffith et al. |
| 5,490,139 A | 2/1996 | Baker et al. |
| 5,491,835 A | 2/1996 | Sasuta et al. |
| 5,509,027 A | 4/1996 | Vook et al. |
| 5,539,925 A | 7/1996 | Yli-Kotila et al. |
| 5,561,841 A | 10/1996 | Markus |
| 5,572,528 A | 11/1996 | Shuen |
| 5,574,720 A | 11/1996 | Lee |
| 5,594,943 A | 1/1997 | Balachandran |
| 5,694,548 A | 12/1997 | Baugher et al. |
| 5,722,044 A | 2/1998 | Padovani et al. |
| 5,737,328 A | 4/1998 | Norman et al. |
| 5,794,137 A | 8/1998 | Harte |
| 5,854,785 A | 12/1998 | Willey |
| 5,870,427 A | 2/1999 | Tiedemann, Jr. et al. |
| 5,974,036 A | 10/1999 | Acharya et al. |
| 5,978,366 A | 11/1999 | Massingill et al. |
| 6,016,316 A | 1/2000 | Moura et al. |
| 6,018,521 A | 1/2000 | Timbs et al. |
| 6,031,863 A | 2/2000 | Jusa et al. |
| 6,034,950 A | 3/2000 | Sauer et al. |
| 6,049,543 A | 4/2000 | Sauer et al. |
| 6,055,428 A | 4/2000 | Soliman |
| 6,073,021 A | 6/2000 | Kumar et al. |
| 6,084,969 A | 7/2000 | Wright et al. |
| 6,094,427 A | 7/2000 | Yi |
| 6,097,952 A | 8/2000 | Kawabata |
| 6,101,394 A | 8/2000 | Illidge |
| 6,137,787 A | 10/2000 | Chawla et al. |
| 6,144,671 A | 11/2000 | Perinpanathan et al. |
| 6,151,502 A | 11/2000 | Padovani et al. |
| 6,157,668 A | 12/2000 | Gilhousen et al. |
| 6,157,833 A | 12/2000 | Lawson-Jenkins et al. |
| 6,157,978 A | 12/2000 | Ng et al. |
| 6,161,008 A | 12/2000 | Lee et al. |
| 6,163,692 A | 12/2000 | Chakrabarti et al. |
| 6,195,552 B1 | 2/2001 | Jeong et al. |
| 6,195,705 B1 | 2/2001 | Leung |
| 6,201,971 B1 | 3/2001 | Purnadi et al. |
| 6,256,300 B1 | 7/2001 | Ahmed et al. |
| 6,272,129 B1 | 8/2001 | Dynarski et al. |
| 6,285,665 B1 | 9/2001 | Chuah |
| 6,300,887 B1 | 10/2001 | Le |
| 6,308,267 B1 | 10/2001 | Gremmelmaier |
| 6,345,043 B1 | 2/2002 | Hsu |
| 6,347,091 B1 | 2/2002 | Wallentin et al. |
| 6,360,100 B1 | 3/2002 | Grob et al. |
| 6,366,561 B1 | 4/2002 | Bender |
| 6,370,380 B1 | 4/2002 | Norefors et al. |
| 6,397,065 B1 | 5/2002 | Huusko et al. |
| 6,400,722 B1 | 6/2002 | Chuah et al. |
| 6,445,922 B1 | 9/2002 | Hiller et al. |
| 6,446,127 B1 | 9/2002 | Schuster et al. |
| 6,449,481 B1 | 9/2002 | Kwon et al. |
| 6,456,604 B1 | 9/2002 | Lee et al. |
| 6,466,964 B1 | 10/2002 | Leung et al. |
| 6,473,418 B1 | 10/2002 | Laroia et al. |
| 6,493,725 B1 | 12/2002 | Iwai et al. |
| 6,496,704 B2 | 12/2002 | Yuan |
| 6,510,153 B1 | 1/2003 | Inoue et al. |
| 6,516,352 B1 | 2/2003 | Booth et al. |
| 6,519,457 B1 | 2/2003 | Jiang et al. |
| 6,529,732 B1 | 3/2003 | Vainiomaki et al. |
| 6,535,493 B1 | 3/2003 | Lee et al. |
| 6,553,227 B1 | 4/2003 | Ho et al. |
| 6,587,680 B1 | 7/2003 | Ala-Laurila et al. |
| 6,611,547 B1 | 8/2003 | Rauhala |
| 6,640,248 B1 | 10/2003 | Jorgensen |
| 6,654,363 B1 | 11/2003 | Li et al. |
| 6,671,512 B2 | 12/2003 | Laakso |
| 6,701,155 B2 | 3/2004 | Sarkkinen et al. |
| 6,708,031 B2 | 3/2004 | Purnadi et al. |
| 6,714,524 B1 | 3/2004 | Kim et al. |
| 6,714,777 B1 | 3/2004 | Naqvi et al. |
| 6,714,788 B2 | 3/2004 | Voyer |
| 6,728,365 B1 | 4/2004 | Li et al. |
| 6,754,492 B1 | 6/2004 | Stammers et al. |
| 6,763,007 B1 | 7/2004 | La Porta et al. |
| 6,768,908 B1 | 7/2004 | Jalloul et al. |
| 6,771,962 B2 | 8/2004 | Saifullah et al. |
| 6,785,256 B2 | 8/2004 | O'neill |
| 6,807,421 B1 | 10/2004 | Ahmavaara |
| 6,842,621 B2 | 1/2005 | Labun et al. |
| 6,842,630 B2 | 1/2005 | Periyalwar |
| 6,862,446 B2 | 3/2005 | Oneill et al. |
| 6,901,063 B2 | 5/2005 | Vayanos |
| 6,917,605 B2 | 7/2005 | Kakemizu et al. |
| 6,937,566 B1 | 8/2005 | Forslow |
| 6,947,401 B2 | 9/2005 | El-Malki et al. |
| 6,950,650 B2 | 9/2005 | Roeder |
| 6,954,442 B2 | 10/2005 | Tsirtsis et al. |
| 6,961,579 B2 | 11/2005 | Inukai et al. |
| 6,965,585 B2 | 11/2005 | Grilli et al. |
| 6,970,445 B2 | 11/2005 | Oneill et al. |
| 6,990,088 B2 | 1/2006 | Madour |
| 6,990,337 B2 | 1/2006 | Oneill et al. |
| 6,990,339 B2 | 1/2006 | Turanyi et al. |
| 6,990,343 B2 | 1/2006 | Lefkowitz |
| 6,992,994 B2 | 1/2006 | Das et al. |
| 6,993,332 B2 | 1/2006 | Pedersen et al. |
| 7,003,311 B2 | 2/2006 | Ebata et al. |
| 7,006,826 B2 | 2/2006 | Cao et al. |
| 7,016,317 B1 | 3/2006 | Pathak et al. |
| 7,027,400 B2 | 4/2006 | O'Neill |
| 7,027,449 B2 | 4/2006 | Garcia-Luna-Aceves et al. |
| 7,047,009 B2 | 5/2006 | Laroia et al. |
| 7,068,640 B2 | 6/2006 | Kakemizu et al. |
| 7,068,654 B1 | 6/2006 | Joseph et al. |
| 7,069,040 B2 | 6/2006 | Iwanaga et al. |
| 7,089,008 B1 | 8/2006 | Back et al. |
| 7,116,654 B2 | 10/2006 | Kim |
| 7,123,599 B2 | 10/2006 | Yano et al. |
| 7,130,291 B1 | 10/2006 | Kim et al. |
| 7,161,913 B2 | 1/2007 | Jung |
| 7,177,641 B1 | 2/2007 | Miernik et al. |
| 7,184,771 B1 | 2/2007 | Mouly et al. |
| 7,197,318 B2 | 3/2007 | Schwarz et al. |
| 7,233,583 B2 | 6/2007 | Asthana et al. |
| 7,233,794 B2 | 6/2007 | Grob et al. |
| 7,263,357 B2 | 8/2007 | Lee et al. |
| 7,266,100 B2 | 9/2007 | Le et al. |
| 7,272,122 B2 | 9/2007 | Trossen et al. |
| 7,283,495 B2 | 10/2007 | Lee et al. |
| 7,283,511 B2 | 10/2007 | Hans et al. |
| 7,290,063 B2 | 10/2007 | Kalliokulju et al. |
| 7,315,554 B2 | 1/2008 | Baum et al. |
| 7,330,542 B2 | 2/2008 | Kauhanen et al. |
| 7,336,953 B2 * | 2/2008 | Kim et al. ............ 455/438 |
| 7,369,855 B2 | 5/2008 | Oneill et al. |
| 7,369,859 B2 | 5/2008 | Gallagher |
| 7,376,101 B2 | 5/2008 | Shim et al. |
| 7,389,110 B2 | 6/2008 | Lee |
| 7,391,741 B2 | 6/2008 | Kang |
| 7,403,789 B2 | 7/2008 | Takano et al. |
| 7,408,917 B1 | 8/2008 | Kyung et al. |
| 7,408,950 B2 | 8/2008 | Okuyama |
| 7,409,428 B1 | 8/2008 | Brabec et al. |
| 7,418,264 B2 | 8/2008 | Kim |
| 7,420,957 B2 | 9/2008 | Kim et al. |

(56) References Cited

U.S. PATENT DOCUMENTS

| | | |
|---|---|---|
| 7,460,504 B2 | 12/2008 | Tsirtsis et al. |
| 7,492,762 B2 | 2/2009 | Chowdhury |
| 7,499,401 B2 | 3/2009 | Buddhikot et al. |
| 7,505,765 B2 | 3/2009 | Frangione et al. |
| 7,515,561 B2 | 4/2009 | Koodli et al. |
| 7,529,239 B2 | 5/2009 | Seppanen |
| 7,567,639 B2 | 7/2009 | Huh et al. |
| 7,583,592 B2 | 9/2009 | Park et al. |
| 7,593,364 B2 | 9/2009 | Asthana |
| 7,623,493 B2 | 11/2009 | Baba et al. |
| 7,653,415 B2 | 1/2010 | Van Rooyen |
| 7,668,541 B2 | 2/2010 | Oneill et al. |
| 7,702,309 B2 | 4/2010 | Faccin et al. |
| 7,706,739 B2 | 4/2010 | Kjellberg |
| 7,729,350 B2 | 6/2010 | Singh et al. |
| 7,742,781 B2 | 6/2010 | Chen et al. |
| 7,773,947 B2 | 8/2010 | Gerlach |
| 7,962,142 B2 | 6/2011 | Oneill et al. |
| 8,112,102 B2 | 2/2012 | Fischer |
| 8,144,664 B2 | 3/2012 | Pani et al. |
| 8,165,587 B2 | 4/2012 | Dahlen et al. |
| 8,184,615 B2 | 5/2012 | Tsirtsis et al. |
| 8,229,120 B2 | 7/2012 | Iwamura et al. |
| 8,583,044 B2 | 11/2013 | Dua |
| 8,830,818 B2 | 9/2014 | Damnjanovic |
| 2001/0019545 A1 | 9/2001 | Okubo et al. |
| 2002/0061009 A1 | 5/2002 | Sorensen |
| 2002/0064144 A1 | 5/2002 | Einola et al. |
| 2002/0065785 A1 | 5/2002 | Tsuda |
| 2002/0067706 A1 | 6/2002 | Bautz et al. |
| 2002/0075859 A1 | 6/2002 | Mizell et al. |
| 2002/0082038 A1 | 6/2002 | Mochizuki |
| 2002/0085518 A1 | 7/2002 | Lim |
| 2002/0107908 A1 | 8/2002 | Dharanikota |
| 2002/0114308 A1 | 8/2002 | Takano et al. |
| 2002/0126701 A1 | 9/2002 | Requena |
| 2002/0136226 A1 | 9/2002 | Christoffel et al. |
| 2002/0161927 A1 | 10/2002 | Inoue et al. |
| 2002/0168982 A1 | 11/2002 | Sorokine et al. |
| 2002/0199012 A1 | 12/2002 | Cable et al. |
| 2003/0009580 A1 | 1/2003 | Chen et al. |
| 2003/0009582 A1 | 1/2003 | Qiao et al. |
| 2003/0018774 A1 | 1/2003 | Flinck et al. |
| 2003/0026220 A1 | 2/2003 | Uhlik et al. |
| 2003/0027572 A1 | 2/2003 | Karlsson et al. |
| 2003/0032430 A1 | 2/2003 | Lee |
| 2003/0036392 A1 | 2/2003 | Yukie |
| 2003/0078047 A1 | 4/2003 | Lee et al. |
| 2003/0092444 A1 | 5/2003 | Sengodan et al. |
| 2003/0101307 A1 | 5/2003 | Gemelli et al. |
| 2003/0103496 A1 | 6/2003 | Lakshmi Narayanan et al. |
| 2003/0104814 A1 | 6/2003 | Gwon et al. |
| 2003/0112766 A1 | 6/2003 | Riedel et al. |
| 2003/0119516 A1 | 6/2003 | Tomishima et al. |
| 2003/0204599 A1 | 10/2003 | Trossen et al. |
| 2003/0212764 A1 | 11/2003 | Trossen et al. |
| 2003/0214922 A1 | 11/2003 | Shahrier |
| 2003/0216140 A1 | 11/2003 | Chambert |
| 2003/0217096 A1 | 11/2003 | McKelvie et al. |
| 2003/0227871 A1 | 12/2003 | Hsu et al. |
| 2003/0236103 A1 | 12/2003 | Tamaki et al. |
| 2004/0002362 A1 | 1/2004 | Chuah et al. |
| 2004/0004736 A1 | 1/2004 | Ogura et al. |
| 2004/0004967 A1 | 1/2004 | Nakatsugawa et al. |
| 2004/0008632 A1 | 1/2004 | Hsu et al. |
| 2004/0015607 A1 | 1/2004 | Bender et al. |
| 2004/0016551 A1 | 1/2004 | Bennett |
| 2004/0017792 A1 | 1/2004 | Khaleghi et al. |
| 2004/0017798 A1 | 1/2004 | Hurtta et al. |
| 2004/0018841 A1 | 1/2004 | Trossen |
| 2004/0076186 A1 | 4/2004 | Chen et al. |
| 2004/0087319 A1 | 5/2004 | Bos et al. |
| 2004/0090913 A1 | 5/2004 | Scudder et al. |
| 2004/0090937 A1 | 5/2004 | Chaskar et al. |
| 2004/0104544 A1 | 6/2004 | Fan et al. |
| 2004/0116153 A1 | 6/2004 | Kaminski et al. |
| 2004/0120317 A1 | 6/2004 | Forssell |
| 2004/0139201 A1 | 7/2004 | Chaudhary et al. |
| 2004/0151148 A1 | 8/2004 | Yahagi |
| 2004/0151193 A1 | 8/2004 | Rune et al. |
| 2004/0165551 A1 | 8/2004 | Krishnamurthi et al. |
| 2004/0166898 A1 | 8/2004 | Tajima |
| 2004/0179544 A1 | 9/2004 | Wilson et al. |
| 2004/0192307 A1 | 9/2004 | Watanabe et al. |
| 2004/0192390 A1 | 9/2004 | Tajima |
| 2004/0218607 A1 | 11/2004 | Hurtta et al. |
| 2004/0228301 A1 | 11/2004 | Rudolf et al. |
| 2004/0228304 A1 | 11/2004 | Riedel et al. |
| 2004/0242222 A1 | 12/2004 | An et al. |
| 2004/0253954 A1 | 12/2004 | Lee et al. |
| 2005/0020262 A1 | 1/2005 | Kim |
| 2005/0020265 A1 | 1/2005 | Funabiki et al. |
| 2005/0053043 A1 | 3/2005 | Rudolf et al. |
| 2005/0058151 A1 | 3/2005 | Yeh |
| 2005/0059417 A1 | 3/2005 | Zhang et al. |
| 2005/0063338 A1 | 3/2005 | Tsui |
| 2005/0063389 A1 | 3/2005 | Elliott et al. |
| 2005/0079823 A1 | 4/2005 | Kurek et al. |
| 2005/0089043 A1 | 4/2005 | Seckin et al. |
| 2005/0090260 A1 | 4/2005 | Semper et al. |
| 2005/0128949 A1 | 6/2005 | Ku et al. |
| 2005/0128990 A1 | 6/2005 | Eom et al. |
| 2005/0141468 A1 | 6/2005 | Kim et al. |
| 2005/0143072 A1 | 6/2005 | Yoon et al. |
| 2005/0201324 A1 | 9/2005 | Zheng |
| 2005/0265303 A1 | 12/2005 | Edwards et al. |
| 2005/0268153 A1 | 12/2005 | Armstrong et al. |
| 2006/0002344 A1 | 1/2006 | Ono et al. |
| 2006/0003768 A1 | 1/2006 | Chiou |
| 2006/0007936 A1 | 1/2006 | Shrum et al. |
| 2006/0029028 A1 | 2/2006 | Kim et al. |
| 2006/0056348 A1 | 3/2006 | Marinier et al. |
| 2006/0067526 A1 | 3/2006 | Faccin et al. |
| 2006/0069809 A1 | 3/2006 | Serlet |
| 2006/0089141 A1 | 4/2006 | Ho et al. |
| 2006/0099948 A1 | 5/2006 | Hoghooghi et al. |
| 2006/0099950 A1 | 5/2006 | Klein et al. |
| 2006/0104232 A1 | 5/2006 | Gidwani |
| 2006/0121883 A1 | 6/2006 | Faccin |
| 2006/0149845 A1 | 7/2006 | Malin et al. |
| 2006/0183479 A1 | 8/2006 | Liu et al. |
| 2006/0217119 A1 | 9/2006 | Bosch et al. |
| 2006/0230019 A1 | 10/2006 | Hill et al. |
| 2006/0268924 A1 | 11/2006 | Marinier et al. |
| 2006/0285520 A1 | 12/2006 | Venkitaraman |
| 2007/0016637 A1 | 1/2007 | Brawn et al. |
| 2007/0019584 A1 | 1/2007 | Qi et al. |
| 2007/0064948 A1 | 3/2007 | Tsirtsis et al. |
| 2007/0066918 A1 | 3/2007 | Dewald et al. |
| 2007/0076653 A1 | 4/2007 | Park et al. |
| 2007/0076658 A1 | 4/2007 | Park et al. |
| 2007/0078999 A1 | 4/2007 | Corson et al. |
| 2007/0083669 A1 | 4/2007 | Tsirtsis et al. |
| 2007/0086389 A1 | 4/2007 | Park et al. |
| 2007/0091810 A1 | 4/2007 | Kim et al. |
| 2007/0099618 A1 | 5/2007 | Kim |
| 2007/0105555 A1 | 5/2007 | Miernik et al. |
| 2007/0105584 A1 | 5/2007 | Grob et al. |
| 2007/0121542 A1 | 5/2007 | Lohr et al. |
| 2007/0147283 A1 | 6/2007 | Laroia et al. |
| 2007/0147286 A1 | 6/2007 | Laroia et al. |
| 2007/0147377 A1 | 6/2007 | Laroia et al. |
| 2007/0171875 A1 | 7/2007 | Suda |
| 2007/0189282 A1 | 8/2007 | Lohr et al. |
| 2007/0191054 A1 | 8/2007 | Das et al. |
| 2007/0191065 A1 | 8/2007 | Lee et al. |
| 2007/0195788 A1 | 8/2007 | Vasamsetti et al. |
| 2008/0019293 A1 | 1/2008 | Chang et al. |
| 2008/0031198 A1 | 2/2008 | Hwang et al. |
| 2008/0051091 A1* | 2/2008 | Phan et al. ............ 455/436 |
| 2008/0074994 A1 | 3/2008 | Jen |
| 2008/0076424 A1 | 3/2008 | Barber et al. |
| 2008/0089287 A1 | 4/2008 | Sagfors et al. |
| 2008/0146231 A1 | 6/2008 | Huang et al. |

(56) References Cited

U.S. PATENT DOCUMENTS

| | | |
|---|---|---|
| 2008/0160999 A1 | 7/2008 | Eklund |
| 2008/0240039 A1 | 10/2008 | Parekh et al. |
| 2008/0242292 A1 | 10/2008 | Koskela et al. |
| 2008/0253332 A1 | 10/2008 | Ore et al. |
| 2008/0259855 A1* | 10/2008 | Yoon et al. ................... 370/329 |
| 2008/0261600 A1 | 10/2008 | Somasundaram et al. |
| 2009/0046573 A1 | 2/2009 | Damnjanovic |
| 2009/0175448 A1 | 7/2009 | Watanabe et al. |
| 2009/0181673 A1 | 7/2009 | Barrett |
| 2009/0190556 A1 | 7/2009 | Venkitaraman |
| 2009/0191878 A1 | 7/2009 | Hedqvist et al. |
| 2009/0274086 A1 | 11/2009 | Petrovic et al. |
| 2009/0285218 A1 | 11/2009 | Adamczyk et al. |
| 2010/0080126 A1 | 4/2010 | Higashida |
| 2011/0019614 A1 | 1/2011 | Oneill et al. |
| 2011/0039546 A1 | 2/2011 | Narasimha et al. |
| 2011/0039552 A1 | 2/2011 | Narasimha et al. |
| 2011/0051660 A1 | 3/2011 | Arora et al. |
| 2011/0103347 A1 | 5/2011 | Dimou |
| 2011/0250892 A1 | 10/2011 | Gupta et al. |
| 2011/0268085 A1 | 11/2011 | Barany et al. |
| 2012/0087312 A1 | 4/2012 | Laroia et al. |
| 2012/0327908 A1 | 12/2012 | Gupta et al. |
| 2013/0208709 A1 | 8/2013 | Corson et al. |
| 2013/0294324 A1 | 11/2013 | Corson et al. |
| 2015/0030003 A1 | 1/2015 | O'Neill et al. |

FOREIGN PATENT DOCUMENTS

| | | |
|---|---|---|
| CL | 36052006 | 6/2007 |
| CL | 36042006 | 7/2007 |
| CL | 36032006 | 5/2010 |
| CN | 1043052 A | 6/1990 |
| CN | 1133669 A | 10/1996 |
| CN | 1344477 A | 4/2002 |
| CN | 1345518 A | 4/2002 |
| CN | 1416284 A | 5/2003 |
| CN | 1481119 A | 3/2004 |
| CN | 1514607 | 7/2004 |
| CN | 1650178 | 8/2005 |
| CN | 1859529 A | 11/2006 |
| EP | 0740440 A2 | 10/1996 |
| EP | 0813346 A1 | 12/1997 |
| EP | 0974895 A2 | 1/2000 |
| EP | 1088463 A1 | 4/2001 |
| EP | 1128704 A1 | 8/2001 |
| EP | 1345370 A2 | 9/2003 |
| EP | 0926608 B1 | 3/2004 |
| EP | 1458209 A2 | 9/2004 |
| EP | 1473872 A2 | 11/2004 |
| EP | 1489808 A2 | 12/2004 |
| EP | 1507421 A1 | 2/2005 |
| EP | 1565024 | 8/2005 |
| EP | 1720267 A1 | 11/2006 |
| EP | 1764942 A2 | 3/2007 |
| GB | 2322046 | 8/1998 |
| GB | 2395629 A | 5/2004 |
| JP | 2084807 | 3/1990 |
| JP | O8116329 | 5/1996 |
| JP | 11308273 | 11/1999 |
| JP | H11341541 A | 12/1999 |
| JP | 2000125343 A | 4/2000 |
| JP | 2001217830 A | 8/2001 |
| JP | 2001237878 A | 8/2001 |
| JP | 2001245355 A | 9/2001 |
| JP | 2002111732 A | 4/2002 |
| JP | 2002513527 A | 5/2002 |
| JP | 2002165249 A | 6/2002 |
| JP | 2002281069 A | 9/2002 |
| JP | 2002281539 A | 9/2002 |
| JP | 2002534923 T | 10/2002 |
| JP | 2002537739 | 11/2002 |
| JP | 2003060685 A | 2/2003 |
| JP | 2003111134 A | 4/2003 |
| JP | 2003348007 | 5/2003 |
| JP | 2003304571 A | 10/2003 |
| JP | 2003338833 A | 11/2003 |
| JP | 2004007578 A | 1/2004 |
| JP | 2004104544 A | 4/2004 |
| JP | 2004147228 | 5/2004 |
| JP | 2004187256 A | 7/2004 |
| JP | 2004201289 A | 7/2004 |
| JP | 2004297130 A | 10/2004 |
| JP | 2004328637 A | 11/2004 |
| JP | 2005531173 T | 10/2005 |
| JP | 2007513569 | 5/2007 |
| JP | 2007521759 | 8/2007 |
| JP | 2007527177 T | 9/2007 |
| JP | 2008053889 A | 3/2008 |
| JP | 4827994 B1 | 11/2011 |
| KR | 20040004918 A | 1/2004 |
| KR | 20040105069 A | 12/2004 |
| KR | 20050023194 A | 3/2005 |
| KR | 20050065123 | 6/2005 |
| KR | 20050066287 A | 6/2005 |
| KR | 20070031810 A | 3/2007 |
| RU | 2117396 C1 | 8/1998 |
| RU | 2003120063 A | 2/2005 |
| RU | 2256299 C2 | 7/2005 |
| RU | 2005115564 A | 11/2005 |
| RU | 2267864 | 1/2006 |
| RU | 2005129079 A | 2/2006 |
| RU | 2292669 | 1/2007 |
| RU | 2294596 C2 | 2/2007 |
| TW | 200527930 | 8/2005 |
| TW | 200708018 | 2/2007 |
| WO | 9501706 A1 | 1/1995 |
| WO | WO9512297 | 5/1995 |
| WO | WO-9804094 A1 | 1/1998 |
| WO | WO9833288 | 7/1998 |
| WO | WO9847302 | 10/1998 |
| WO | WO9856140 A2 | 12/1998 |
| WO | WO9905828 A1 | 2/1999 |
| WO | WO9927718 | 6/1999 |
| WO | WO9966748 A1 | 12/1999 |
| WO | WO0018173 | 3/2000 |
| WO | WO0041401 | 7/2000 |
| WO | WO0041426 A1 | 7/2000 |
| WO | WO0128160 A2 | 4/2001 |
| WO | WO0158196 A1 | 8/2001 |
| WO | WO0163947 | 8/2001 |
| WO | WO0178440 | 10/2001 |
| WO | WO0219746 A1 | 3/2002 |
| WO | WO0243409 A2 | 5/2002 |
| WO | WO0247407 A2 | 6/2002 |
| WO | WO02056551 A1 | 7/2002 |
| WO | WO03007484 A2 | 1/2003 |
| WO | WO03017582 | 2/2003 |
| WO | WO03092316 A1 | 11/2003 |
| WO | WO03098816 A2 | 11/2003 |
| WO | WO03105516 A1 | 12/2003 |
| WO | 2004039022 A2 | 5/2004 |
| WO | WO2004068739 A1 | 8/2004 |
| WO | WO2004070989 | 8/2004 |
| WO | WO2004075468 A2 | 9/2004 |
| WO | WO2004079949 A1 | 9/2004 |
| WO | WO2004105272 A1 | 12/2004 |
| WO | WO2004107638 A2 | 12/2004 |
| WO | WO-2004114695 A1 | 12/2004 |
| WO | WO2005029790 | 3/2005 |
| WO | 2005048629 A1 | 5/2005 |
| WO | WO2005062633 | 7/2005 |
| WO | WO-2005078966 A1 | 8/2005 |
| WO | WO2005084146 A2 | 9/2005 |
| WO | 2005120183 | 12/2005 |
| WO | WO2006002676 A1 | 1/2006 |
| WO | WO2006083131 A1 | 8/2006 |
| WO | WO2008113373 A1 | 9/2008 |
| WO | WO-2008131401 A1 | 10/2008 |

OTHER PUBLICATIONS

Written Opinion—PCT/US2008/068245—International Search Authority—European Patent Office—Dec. 16, 2008.

(56) References Cited

OTHER PUBLICATIONS

Dorot, V., et al., "An Explanatory Dictionary of Modern Computer Terms," 2nd Edition, bhv, Saint Petersburg, 2001, 'Program Product' on p. 339.
European Search Report—EP11164559—Search Authority—Munich—Jun. 28, 2011.
Nortel, Forward Hand-Off options, R2-071980, 3GPP TSG-RAN WG2 Meeting #58, Kobe, Japan, May 7-11, 2007, sections 2-3.
International Preliminary Report on Patentability—PCT/US2011/031841, The International Bureau of WIPO—Geneva, Switzerland—Oct. 9, 2012 (100781WO).
3GPP, "3rd Generation Partnership Project, Technical Specification Group Radio Access Network, E-UTRAN Mobility Evaluation and Enhancement,(Release 9)", 3GPP Draft, R1-090856 TP for TR for Mobility Studies, 3rd Generation Partnership Project (3GPP), Mobile Competence Centre, 650, Route des Lucioles, F-06921 Sophia-Antipolis Cedex, France, No. Athens, Greece, 20090203, Feb. 3, 2009, 16 pgs., XP050318707.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9) , 3GPP Standard; 3GPP TS 36.300, 3rd Generation Partnership Project (3GPP), Mobile Competence Centre ; 650, Route des Lucioles ; F-06921 Sophia-Antipolis Cedex ; France, No. V9.2.0, Jan. 7, 2010, pp. 1-178, XP050401821, [retrieved on Jan. 7, 2010].
"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route des Lucioles ; F-06921 Sophia-Antipolis Cedex; France, No. V8.2.0, May 1, 2008, pp. 1-151, XP050377645.
3rd Generation Partnership Project; Technical Specification Group Radio Access Network; Evolved Universal Terrestrial Radio Access (E-UTRA) Radio Resource Control (RRC); Protocol specification (Release 9), 3GPP Standard; 3GPP TS 36.331, 3rd Generation Partnership Project (3GPP), Mobile Competence Centre ; 650, Route des Lucioles ; F-06921 Sophia-Antipolis Cedex ; France, No. V9.1.0, Jan. 7, 2010, pp. 1-221, XP050401822, [retrieved on Jan. 7, 2010].
Baker, F., IETF, "RSVP Management Information Base Using SMIv2," Network Working Group, Request for Comments: 2206, pp. 1-64 (Sep. 1997).
Basic Knowledge of Communications Term of Switching HUB, URL: http://www.wdic.org/w/WDIC/%E3%82%B9%E3%82%A4%E3%83%83%E3%83%81%E3%83%B3%E3%82%B0HUB .
Berger, L., et al., "RSVP Extensions for IPSEC Data Flows," IETF, Network Working Group, Request for Comments: 2207, pp. 1-14 (Sep. 1997).
Berger, L., "RSVP Refresh Overhead Reduction Extensions," IETF Network Working Group, Request for Comments: 2961, pp. 1-34 (Apr. 2001).
Bos et al., "A Framework for End-to-End Perceived Quality of Service Negotiation", IETF Internal Draft, draft-bos-mmusic-sdpqos-framework-00.txt, Nov. 2001, pp. 1-22.
Braden, R., "Resource ReSerVation Protocol (RSVP)—Ver. 1, Message Processing Rules," IETF, Network Working Group, Request for Comments: 2209, pp. 1-25 (Sep. 1997).
Braden, R., "Resource ReSerVation Protocol (RSVP)—Ver. 1 Functional Specification". IETF, Network Working Group, Request for Comments: 2205, pp. 1-112 (Sep. 1997).
Camarillo, G., et al., "Integration of Resource Management and SIP," IETF Internet Draft, draft-ietf-sip-manyfolks-resource-04.ps, Feb. 25, 2002, pp. 1-18.
Campbell, Andrew T. et al., "IP Micro-Mobility Protocols", Mobile Computing and Communications Review (MC2R), vol. 4, No. 4, pp. 45-53, (Oct. 2001).

Droms, R.: "Dynamic Host Configuration Protocol," IETF Standard, RFC 2131, Internet Engineering Task Force, IETF, CH, pp. 1-45, (Mar. 1997) XP015007915.
Etri, "Source Specific Multicast (SSM) Explicit Multicast (Xcast)" pp. 1-27 (Jun. 28, 2001).
Ho, Michael. "Integration AAA with Mobile IPv4", Internet Draft, pp. 1-59, Apr. 2002.
Huawei, et al.,"Clarification of definitions of HO failure cases", RAN3, 3GPP Draft; 36300_CR0202_(REL-9)_R2-101906_R3-100635, 3rd Generation Partnership Project (3GPP), Mobile Competence Centre ; 650, Route des Lucioles ; F-06921 Sophia-Antipolis Cedex ; France, vol. RAN WG2, No. San Francisco, USA; 20100222, Mar. 4, 2010, XP050422194, 3 pgs. [retrieved on Mar. 4, 2010].
Ian F.A., et al., "Mobility Management in Next-Generation Wireless Systems", Proceedings of the IEEE, IEEE. New York, us, vol. 87, No. 8, Aug. 1, 1999 , XP011044241, ISSN: 0018-9219, pp. 1347-1384.
Johnson, D., et al., IETF Mobile IP Working Group, "Mobility Support in IPv6," ; Feb. 26, 2003 Downloaded From http://www.join.uni-muenster.de on Dec. 29, 2004, pp. 1-169.
Karagiannis, Georgios. "Mobile IP: State of the Art Report," Ericsson, No. 3/0362-FCP NB 102 88 UEN, pp. 1-63, (Jul. 13, 1999).
Koodli, R. et al.: "Fast Handovers and Context Transfers in Mobile Networks" Computer Communication Review, ACM, New York, NY, US, vol. 31, No. 5, Oct. 1, 2001, pp. 37-47, XP001115324 ISSN: 0146-4833 abstract p. 2, right-hand column, last paragraph—p. 3, left-hand column, paragraph 3 p. 5, right-hand column, last paragraph—p. 7, right-hand column, last paragraph.
Leon-Garcia, Alberto; "Communication Networks: Fundamental Concepts and Key Architectures" McGraw-Hill; 2nd Edition; Copyright 2004, pp. 44-52, 429-431.
Li, Yalun et al. "Protocol Architecture for Universal Personal Computing," IEEE Journal on Selected Areas in Communications, IEEE Inc. New York, US, vol. 15, No. 8, Oct. 1, 1997, pp. 1467-1476, XP000721278 ISSN: 0733-8716.
Loughney, J. et al. "Context Transfer Protocol (CXTP)" IETF Standard, Request for Comments: 4067, Internet Engineering Task Force, IETF, CH, Jul. 2005, XP015041932 ISSN: 0000-0003 pp. 1 to 33.
Mankin, A., et al., "Resource ReSerVation Protocol (RSVP) Version 1, Applicability Statement: Some Guidelines on Deployment", IETF, Network Working Group, Request for Comments: 2208, pp. 1-6 (Sep. 1997).
Marshall, W. et al. "Integration of Resource Management and SIP: SIP Extensions for Resource Management," IETF Internet Draft, draft-ietf-sip-manyfolks-resource-02.txt, Aug. 2001, pp. 1-28.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany June 24-26, 2004. Piscataway, NJ, USA IEEE, June 24, 2004, pp. 143-148, XP010782619, ISBN 0789385136, Para 3, point B.
Moy, J., "OSPF Version 2", Network Working Group, Request for Comments: 2328, pp. 1-244 (Apr. 1998).
"Network Layer Protocol," Jul. 13, 2002, chap. 6, pp. 1-35, URL: http://www2.yamanashi-ken.ac.jp/~itoyo/lecture/network/network06/index06.htm.
Panasonic, "Necessity of forward handover", 3GPP Draft, R2-062146, 3rd Generation Partnership Project (3GPP), Mobile Competence Centre, 650, Route des Lucioles, F-06921 Sophia-Antipolis Cedex, France, vol. RAN WG2, No. Tallinn, 20060823, Aug. 23, 2006, XP050131764.
Papalilo, D. et al. "Extending SIP for QoS Support", www.coritel.it/publications/IP_download/papalilo-salsano-veltri.pdf, Dec. 8, 2001, pp. 1-6.
Perkins, C., "IP Mobility Support for IPv4", Nokia Research Center, Network Working Group, Request for Comments: 3220, Jan. 2002, downloaded from http://www.ietf.org on Dec. 29, 2004, pp. 1-92.
Perkins, C., "IP Mobility Support", IBM, Network Working Group, Request for Comments: 2002, pp. 1-79 (Oct. 1996).
Pollini, G P et al., "Trends in Handover Design" IEEE 34(3), pp. 82-90, Mar. 1, 1996, XP00557380.
Rosenberg J et al:RFAC 3261: "SIP: Session Initiation Protocol" 20020601; 20020600, Jun. 1, 2002, pp. 1-269, XP015009039.

(56) References Cited

OTHER PUBLICATIONS

Schulzrinne et al., "Application-Layer Mobility Using SIP", 0-7803-7133 IEEE, pp. 29-36, Jan. 2000.

Takako Mita, et al., A Proposal for Seamless QoS Support in Mobile Networks, Research Report of Information Processing Society 2004-MBL-29, Japan, Information Processing Society of Japan, May 13, 2004, vol. 2004, No. 44, pp. 129-134.

"Terms for Use in Textbooks and Lectures on Distributed Computing," Feb. 13, 2005, URL: http://web.archive.org/web/20050213090736/http://www.nuis.ac.jp/~nagai/lecture/dce.html.

Thulasi, A., et al., "IPv6 Prefix Delegation Using ICMPv6", Network Working Group, Hewlett-Packard, pp. 1-34, Apr. 2004.

TIA/EIA/IS-707A.8 "Data Service Options for Spread Spectrum Systems: Radio Link Protocol Type 2" pp. 1-1:4:12 (Mar. 1999).

Trossen, D. et al., "A Dynamic Protocol for Candidate Access-Router Discovery", 35 pgs., Mar. 14, 2003.

Valko, A.G. et al.: "Cellular IP: A New Approach to Internet Host Mobility" Computer Communication Review, Association for Computing Machinery. New York, US Vol. 29, No. 1, Jan. 1999, pp. 50-56, XP000823873 ISSN: 0146-4833, p. 56, Line 7-Line13.

Wedlund et al: "Mobility Support Using SIP", Proc. Of ACM/IEEE International Conference on Wireless and Mobile Multimedia (WoWMoM '99), Seattle, Washington, Aug. 1999.

Wroclawski, J., "The Use of RSVP with IETF Integrated Services," IETF, Network Working Group, Request for Comments: 2210, pp. 1-33 (Sep. 1997).

Zhou, S., et al., "A Location Management Scheme for Mobility Support in Wireless IP Networks Using Session Initiation Protocol (SIP)", 1531-2216/01 IEEE, pp. 486-491, Oct. 2001.

Zte, et al., "Handover Cause Report for Mobility Robustness Optimization", 3GPP Draft; R3-092982, 3rd Generation Partnership Project (3GPP), Mobile Competence Centre ; 650, Route des Lucioles ; F-06921 Sophia-Antipolis Cedex ; France, No. Jeju; 20091109, Nov. 9, 2009, XP050392455, 4 pgs. [retrieved on Nov. 9, 2009].

3GPP TS 36.423, "3rd Generation Partnership Project; Technical Specification Group Radio Access Network; Evolved Universal Terrestrial Radio Access (E UTRA) and Evolved Universal Terrestrial Radio Access Network (EUTRAN); X2 Application Protocol (X2AP)", version 0.0.1, Release 8, year 2007, pp. 9.

Mockapetris P., "Domain Names—Implentation and Specification", IETF RFC 1035, Nov. 1987.

Evolved Universal Terrestrial Radio Access (E-UTRA) and Evolved Universal Terrestrial Radio Access Network (E-UTRAN); Overall description; Stage 2 (Release 9), 3GPP TS 36.300 V9.2.0, Dec. 2009, pp. 56-61, Retrieved from the internet: URL: http://www.3gpp.org/ftp/Specs/archive/36_series/36.300/36300-920.zip.

Qualcomm Europe, T-Mobile, "Network based solutions to inbound mobility in the presence of PCI confusion", 3GPP TSG-RAN WG3 #64, R3-091027, May 2008, pp. 1-4, Retrieved from the internet: URL: http://www.3gpp.org/ftp/tsg_ran/WG3_lu/TSGR3_64/Docs/R3-091027.zip.

Qualcomm Incorporated, "UE context fetch procedure stage 2", 3GPP TSG-RAN WG3 Meeting #67, R3-100893, Feb. 2010, pp. 1-4, Retrieved from the internet URL: http://www.3gpp.org/ftp/tsg_ran/WG3_lu/TSGR3_67/Docs/R3-100893.zip.

\* cited by examiner

RECOVERY FROM HANDOFF ERROR DUE TO FALSE DETECTION OF HANDOFF COMPLETION SIGNAL AT ACCESS TERMINAL

CROSS-REFERENCE TO RELATED APPLICATIONS

This application claims the benefit of U.S. Provisional Patent application Ser. No. 60/946,128 entitled "METHODS AND APPARATUSES FOR RECOVERING FROM HANDOFF ERROR DUE TO FALSE DETECTION OF LINK ASSIGNMENT BLOCK (LAB) AT ACCESS TERMINAL" which was filed Jun. 25, 2007. The entirety of the aforementioned application is herein incorporated by reference.

BACKGROUND

I. Field

The following description relates generally to wireless communications, and more particularly to confirming handoff to mitigate impact of false detection of a handoff completion signal in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ... ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Handoffs oftentimes are utilized in wireless communication systems to transfer ongoing calls, data sessions, etc. from a source base station to a target base station. For instance, an access terminal can request to handoff from the source base station to the target base station. Typically, upon sending a handoff request signal to the target base station, the access terminal listens for a handoff completion signal sent from the target base station. Receipt of the handoff completion signal commonly results in the handoff to the target base station being completed. However, this technique can be susceptible to false handoff completion signal detection by the access terminal. By way of illustration, due to fading errors, physical channel errors, and so forth, when the target base station has not transmitted a handoff completion signal over the downlink, the access terminal can improperly believe such handoff completion signal was sent by the target base station.

False positive detection of the handoff completion signal can deleteriously impact overall wireless communication system performance. The access terminal can be looking for a handoff completion signal from the target base station to complete handoff when employing conventional techniques. Further, the access terminal can see a false handoff completion signal and think that handoff is complete. Moreover, the target base station has not sent a handoff completion signal and does not have knowledge of such handoff. Accordingly, the target base station is not transmitting power control commands, the access terminal is being power controlled by random power control commands (e.g., power is undergoing random: drift, ... ) and is not being served (e.g., not receiving data packets from the target base station, ... ). Thus, such a scenario results in loss of connectivity for the access terminal as well as interference to other users (e.g., on a reverse link channel such as a reverse link data channel, a reserve link control channel, Reverse CDMA Control Channel (R-CDCCH), ... ).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating recovery from error due to false detection of completion signals at an access terminal. An access terminal specific request signal can be sent to a target base station to initiate handoff or semi-connected state exit. A completion signal can be transferred in response to the access terminal specific request signal. To mitigate errors stemming from false detection of the completion signal at the access terminal, forward link and reverse link confirmation signals can be transferred to confirm successful handoff or connected state re-entry completion. For example, the access terminal can determine handoff or re-entry to be successful when a forward link confirmation signal is detected prior to expiration of a timer. Moreover, the forward link and reverse link confirmation signals can each include more CRC bits as compared to a number of CRC bits included in the completion signal.

According to related aspects, a method that facilitates mitigating error associated with false detection of completion signals in a wireless communication environment is described herein. The method can include transmitting an access terminal specific request signal to a target base station. Further, the method can comprise detecting a completion signal in response to the request signal. The method can also include starting a timer upon detecting the completion signal. Moreover, the method can include confirming transmission of the completion signal from the target base station by determining whether a forward link confirmation signal is received from the target base station prior to expiration of the timer.

Another aspect relates to a wireless communications apparatus. The wireless communications apparatus can include a memory that retains instructions related to sending an access terminal specific request signal to a target base station, receiving a completion signal in response to the request signal, initiating a timer upon receiving the completion signal, and confirming transmission of the completion signal from the target base station by identifying whether a forward link confirmation signal is obtained from the target base station prior to expiration of a timer. Further, the wireless communications apparatus can include a processor, coupled to the memory, configured to execute the instructions retained in the memory.

Yet another aspect relates to a wireless communications apparatus that enables utilizing an error recovery scheme in a wireless communication environment. The wireless communications apparatus can include means for transferring an access terminal specific request signal to a target base station. Moreover, the wireless communications apparatus can include means for initiating a timer when a completion signal is detected. Further, the wireless communications apparatus can include means for confirming transmission of the completion signal from the target base station by determining whether a forward link confirmation signal is obtained before expiration of the timer.

Still another aspect relates to a computer program product that can comprise a computer-readable medium. The computer-readable medium can include code for transferring an access terminal specific request signal to a target base station. Further, the computer-readable medium can include code for initiating a timer when a completion signal is detected. Moreover, the computer-readable medium can comprise code for confirming transmission of the completion signal from the target base station by determining whether a forward link confirmation signal is obtained before expiration of the timer.

In accordance with another aspect, an apparatus in a wireless communication system can include a processor, wherein the processor can be configured to transmit an access terminal specific request signal to a target base station. The processor can also be configured to detect a completion signal in response to the request signal. Moreover, the processor can be configured to start a timer upon detecting the completion signal. Further, the processor can be configured to confirm transmission of the completion signal from the target base station by determining whether a forward link confirmation signal is received from the target base station prior to expiration of the timer.

According to other aspects, a method that facilitates recovering from false completion signal detection in a wireless communication environment is described herein. The method can include receiving an access terminal specific request signal from an access terminal. Further, the method can include transmitting a completion signal to the access terminal in response to the request signal, the completion signal indicates resources assigned to the access terminal. Moreover, the method can include transmitting a forward link confirmation signal to the access terminal, the forward link confirmation signal enables the access terminal to confirm receipt of the completion signal.

Yet another aspect relates to a wireless communications apparatus that can include a memory that retains instructions related to obtaining an access terminal specific request signal from an access terminal, sending a completion signal to the access terminal in response to the request signal, the completion signal indicates a non-zero amount of resources allocated to the access terminal, and sending a forward link confirmation signal to the access terminal, the forward link confirmation signal enables the access terminal to confirm receipt of the completion signal. Further, the wireless communications apparatus can comprise a processor, coupled to the memory, configured to execute the instructions retained in the memory.

Another aspect relates to a wireless communications apparatus that enables mitigating error associated with false completion signal detection in a wireless communication environment. The wireless communications apparatus can include means for analyzing an obtained request signal specific to an access terminal. Moreover, the wireless communications apparatus can comprise means for sending a completion signal to the access terminal based upon the request signal. Further, the wireless communications apparatus can include means for transmitting a forward link confirmation signal to the access terminal that allows the access terminal to confirm receipt of the completion signal.

Still another aspect relates to a computer program product that can comprise a computer-readable medium. The computer-readable medium can include code for evaluating an obtained request signal specific to an access terminal. Further, the computer-readable medium can comprise code for transferring a completion signal to the access terminal based upon the request signal, the completion signal indicates a non-zero amount of resources allocated to the access terminal. Moreover, the computer-readable medium can include code for transferring a forward link confirmation signal to the access terminal that allows the access terminal to confirm receipt of the completion signal.

In accordance with another aspect, an apparatus in a wireless communication system can include a processor, wherein the processor can be configured to receive an access terminal specific request signal from an access terminal. Further, the processor can be configured to transmit a completion signal to the access terminal in response to the request signal, the completion signal indicates resources assigned to the access terminal. Moreover, the processor can be configured to transmit a forward link confirmation signal to the access terminal, the forward link confirmation signal enables the access terminal to confirm receipt of the completion signal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
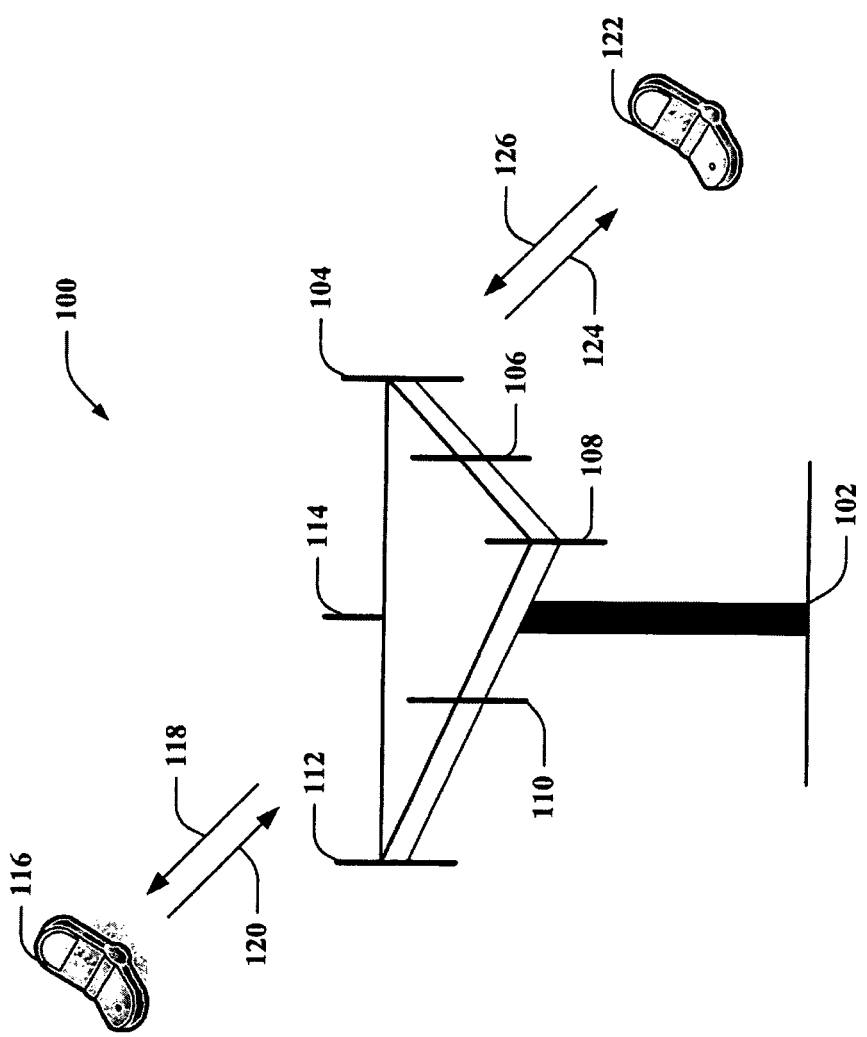
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 provides mechanisms for recovering from handoff error due to false detection of handoff completion signals at access terminals 116, 122. A particular access terminal (e.g., access terminal 116, access terminal 122, . . . ) can initiate handoff from a source base station to a target base station (e.g., base station 102 can be the target base station such that the particular access terminal transitions to base station 102 from a disparate base station (not shown), base station 102 can be the source base station such that the particular access terminal transitions from base station 102 to a disparate base station (not shown), . . . ) by sending a handoff request signal to the target base station to which the particular access terminal desires to transition (e.g., the handoff request signal can be sent while the particular access terminal is in a Try to Handoff state, . . . ). The handoff request signal can be a terminal specific signal that includes information pertaining to an identity of the particular access terminal from which such signal is transmitted. Thereafter, the particular access terminal can monitor a forward link channel for a handoff completion signal transmitted from the target base station. Upon detecting the handoff completion signal (whether or not such detection of the handoff completion signal is erroneous), the particular access terminal can transition to a Confirm Handoff state. Further, while in Confirm Handoff state, the particular access terminal awaits a forward link confirmation signal from the target base station. Moreover, the particular access terminal can send a reverse link confirmation signal to the target base station to enable the target base station to confirm that the handoff has been completed. If the forward link confirmation signal is received from the target base station within a certain timeout, then the particular access terminal can transition to Handoff Complete state. Alternatively, if the forward link confirmation signal is not attained within a certain timeout, then the particular access terminal can return to Try to Handoff state.

The scheme used by system 100 can improve error recovery. For instance, system 100 can rely upon access terminals 116, 122 confirming handoff using forward link confirmation signal reception. The forward link confirmation signals, for example, can be a forward link (FL) packet, an acknowledgement (ACK) to a reverse link (RL) packet, and the like. Thus, a data packet with 24 bits of cyclic redundancy check (CRC) can be used to confirm the handoff (e.g., rather than 16 bits of CRC as used for the handoff completion signal, . . . ). Moreover, base station 102 (as well as any disparate base station(s)) can assist access terminals 116, 122 by assigning resources in response to received handoff request signals.

False handoff confirmation signal detection can occur if there is cyclic redundancy check (CRC) failure on a forward link control segment (FLCS) from the target base station while the access terminal is trying to effectuate handoff. The CRC can be 16 bits, and the access terminal can be looking for a specific header (e.g., the header can be 2 bits, a particular value for the header can indicate handoff completion, . . . ), so the overall probability can be on the order of $2^{-18}$. For instance, if there are about 5 handoff completion signals per frame, and the access terminal waits for several frames (e.g., the access terminal can wait 20 frames, . . . ) before typical handoff is complete, then the actual probability can be higher (e.g., about a factor of 100 larger, . . . ). Hence, the false handoff completion signal probability can be $4 \times 10^{-4}$. For one handoff every 10 seconds, this can result in one false handoff completion signal every 2.5E04 seconds (e.g., about 7 hours, . . . ) for a given access terminal. Thus, false handoff completion signal detection can occur frequently when considering a system wide perspective.

Accordingly, system 100 addresses the foregoing by mitigating the error scenario where the access terminal thinks handoff is complete to a target base station, while the target base station thinks it is non-serving. More particularly, system 100 can utilize a two state scheme before the access terminal can conclude that the handoff is complete. For example, the first state (e.g., Try to Handoff state, . . . ) can be associated with a false handoff completion signal probability on the order of $10^{-4}$. Further, while in the second state (e.g., Confirm Handoff state, . . . ), the access terminal can obtain a forward link confirmation signal (e.g., FL packet, ACK to RL packet, . . . ); the probability of false ACK to RL packet or false FL packet can be better than $10^{-3}$. The combined probability of false detection while in these two states can be $10^{-7}$ as opposed to a probability on the order of $10^{-4}$ which is commonly encountered with conventional techniques.

It is to be appreciated that the claimed subject matter contemplates any type of handoff. Although much of the discussion herein refers to handoff from a source base station to a target base station, it is to be appreciated that handoff can be from a source sector to a target sector. Further, the source sector and the target sector can be associated with disparate base stations and/or a common base station.

Figure 2:
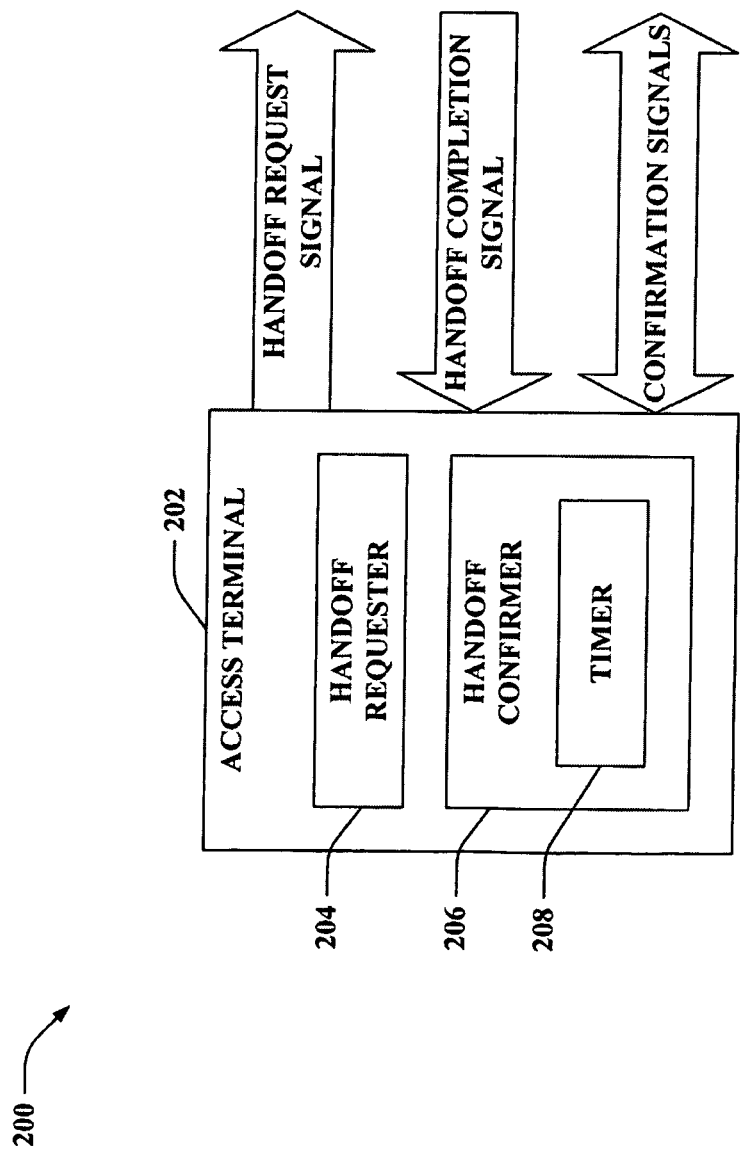
FIG. 2 is an illustration of an example system that enables recovering from false detection of handoff completion signals in a wireless communication environment.

Turning to FIG. 2, illustrated is a system 200 that enables recovering from false detection of handoff completion signals in a wireless communication environment. System 200 includes an access terminal 202 that can transmit and/or receive information, signals, data, instructions, commands, bits, symbols, and the like to and/or from one or more base stations (not shown). Access terminal 202 can further include a handoff requester 204 and a handoff confirmer 206.

According to an illustration, a decision for access terminal 202 to handoff to a target base station can be made while access terminal 202 is being served by a source base station (e.g. prior serving base station, . . . ). For instance, access terminal 202 (e.g., handoff requester 204 of access terminal 202, . . . ) can yield such decision; however, the claimed subject matter contemplates this decision being made by a base station (e.g., the source base station, the target base station, a disparate base station, . . . ) or any disparate component (e.g., disparate access terminal, network node, . . . ) in the wireless communication environment. By way of further example, request (REQ) based handoff, channel quality indicator (CQI) based handoff, or access based handoff can be utilized. Accordingly, handoff requester 204 can make a handoff decision based upon forward link (FL) pilot measurements, Reverse Channel Quality Indicator Channel (R-CQICH) erasure indicators, and so forth.

When the decision to handoff is made by (or communicated to) access terminal 202, access terminal 202 can transition to a Try to Handoff state. Further, handoff requester 204 can generate and/or transmit a handoff request signal. Handoff requester 204 can select a target base station, for example. Moreover, handoff requester 204 can send the handoff request signal to the target base station over the reverse link. The handoff request signal transferred by handoff requester 204 can be specific to access terminal 202 (e.g., the handoff request signal can include information related to an identity of access terminal 202, . . . ).

After transferring the handoff request signal, access terminal 202 awaits a handoff completion signal (e.g., transmitted by the target base station). The handoff completion signal can be sent over the forward link. The handoff completion signal can be, for example, a reverse link assignment block (RLAB), a forward link assignment block (FLAB), an AccessGrant, or the like.

Handoff confirmer 206 (and/or access terminal 202 in general) can monitor for the handoff completion signal. Upon detecting the handoff completion signal, handoff confirmer 206 can transition access terminal 202 to a Confirm Handoff state. Confirm Handoff state can be employed to mitigate impact associated with false handoff completion signal detection. While in Confirm Handoff state, handoff confirmer 206 can monitor the forward link for a forward link confirmation signal. The forward link confirmation signal can be a forward link (FL) packet, an acknowledgement (ACK) to a reverse link (RL) packet, and so forth. Further, the forward link confirmation signal can have a low probability of false detection. Additionally, handoff confirmer 206 can send a reverse link confirmation signal to the target base station. The reverse link confirmation signal can be a reverse link (RL) packet, a forward link (FL) packet acknowledgement (ACK), or the like.

Handoff confirmer 206 can further include a timer 208. Timer 208 can track an amount of time that has elapsed since detection of the handoff completion signal. Timer 208 can continue to track the elapsed time until handoff confirmer 206 (or access terminal 202 in general) obtains the forward link confirmation signal. Further, timer 208 can indicate that an amount of time greater than a threshold has passed since receipt of the handoff completion signal without receipt of the forward link confirmation signal. The threshold time limit employed by timer 208 can be preset, dynamically determined, and so forth. According to an example, the threshold time duration can be 50 ms; however, the claimed subject matter is not so limited.

When handoff confirmer 206 determines that the forward link confirmation signal has been obtained prior to expiration of the threshold time period as recognized using timer 208, access terminal 202 can transition to Handoff Complete state. Thus, access terminal 202 can be served by the target base station. Alternatively, when handoff confirmer 206 recognizes that the threshold time period expired prior to receipt of the forward link confirmation signal (e.g., as determined via timer 208), access terminal 202 can return to Try to Handoff state. Thus, if handoff confirmation timer 208 expires and/or handoff requester 204 yields a disparate decision to handoff to a disparate base station (other than the target base station), access terminal 202 can return to Try to Handoff state.

Figure 3:
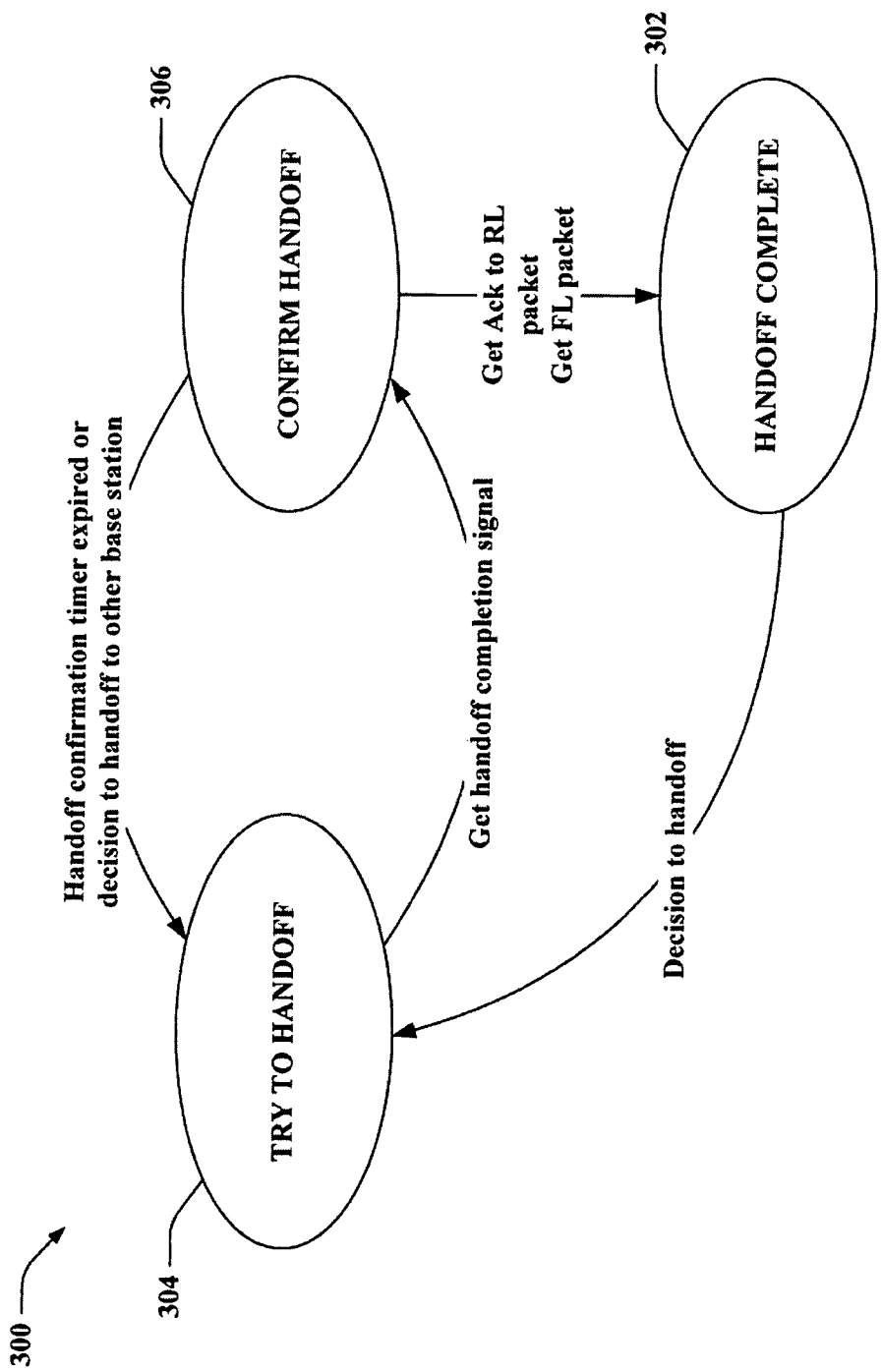
FIG. 3 is an illustration of an example access terminal state diagram in accordance with various aspects of the subject disclosure.

Now referring, to FIG. 3, illustrated is an example access terminal state diagram 300. By way of illustration, state diagram 300 can represent states and transitions between states associated with access terminal 202 of FIG. 2. State diagram 300 includes three states: Handoff Complete state 302, Try to Handoff state 304, and Confirm Handoff state 306. In comparison, conventional schemes typically lack a state similar to Confirm Handoff state 306.

While being served by a base station, an access terminal can be in Handoff Complete state 302. Upon a decision to handoff being effectuated, the access terminal can switch to Try to Handoff state 304. By way of illustration, while in Try to Handoff state 304, the access terminal can send a handoff request signal (e.g., REQ, . . . ) with non-zero buffer size even if a buffer associated with the access terminal is empty when REQ based handoff is utilized. By way of further example, normal operation can be employed by the access terminal (e.g., for sending the handoff request signal, . . . ) while in Try to Handoff state 304 when CQI based handoff or access based handoff is used. Thus, with CQI based handoff or access based handoff, a handoff request signal can be sent by the access terminal to the target base station while in Try to Handoff state 304, and the access terminal can monitor for a handoff completion signal from the base station.

According to an example where REQ based handoff is employed, a request channel can be used by the access terminal to request reverse link OFDMA resources; when OFDMA resources are assigned, the access terminal can send a reverse link data packet. During handoff while in Try to Handoff state 304, the access terminal sends the handoff request signal to the target base station. Based on the request, the target base station can realize that the access terminal desires handoff to happen, and thus, the target base station can transfer an RLAB to the access terminal indicating that the target base station has recognized the request of the access terminal and has granted the handoff. Under conventional scenarios, the handoff request signal sent to the target base station can be a request to handoff that lacks a request for resources (e.g., since the access terminal can be handing off because of channel conditions when it lacks data to be transmitted, zero request signal, . . . ). In contrast, even when the access terminal lacks data to be sent, the handoff request signal can request a certain amount of resources on the reverse link which can be utilized for Confirm Handoff state 306.

When a handoff completion signal (e.g. RLAB, FLAB, AccessGrant, . . . ) is detected, the access terminal can switch to Confirm Handoff state 306 from Try to Handoff state 304. According to an illustration, if an RLAB is received by the access terminal, then the access terminal can transmit a NULL packet instead of erasure sequences in response; however, the claimed subject matter is not so limited. Further, on entering Confirm Handoff state 306, a timer with a threshold duration can start. For instance, the duration can be preset, dynamically determined, or the like. Pursuant to an example, the duration can be 50 ms; however, it is contemplated that any duration can be employed. Moreover, if the timer expires prior to receiving a forward link confirmation signal, then the access terminal transitions to Try to Handoff state 304 from Confirm Handoff state 306. Similarly, if a decision to handoff to a base station other than the target base station is effectuated while the access terminal is in Confirm Handoff state 306, then the access terminal can switch back to Try to Handoff state 304.

According to another example, if the access terminal remains in Confirm Handoff state 306 without receiving the forward link confirmation signal or returns to Try to Handoff state 304 upon expiration of the timer prior to receiving the forward link confirmation signal, then the access terminal can try to perform reconfirmation. Following this example, if handoff was initiated by sending access probes, then the access terminal can send access probes again. Further, if handoff was initiated by sending either a CQI signal or a REQ signal, then the access terminal can continue to send the CQI signal or the REQ signal until confirmation is attained. The foregoing allows the base station to detect a second handoff request signal (e.g., in case of the base station missing the first handoff request signal, . . . ) and send a second completion signal.

While in Confirm Handoff state 306, when a forward link confirmation signal is obtained by the access terminal, the access terminal transitions to Handoff Complete state 302. The forward link confirmation signal can be an ACK to an RL packet, an FL packet, and so forth. Further, the forward link confirmation signal can have a low probability of false detection. The forward link confirmation signal is used by the access terminal to confirm handoff to the target base station. Moreover, when in Confirm Handoff state 306, the access terminal can transmit a reverse link confirmation signal that can be employed by the target base station to verify handoff completion.

Figure 4:
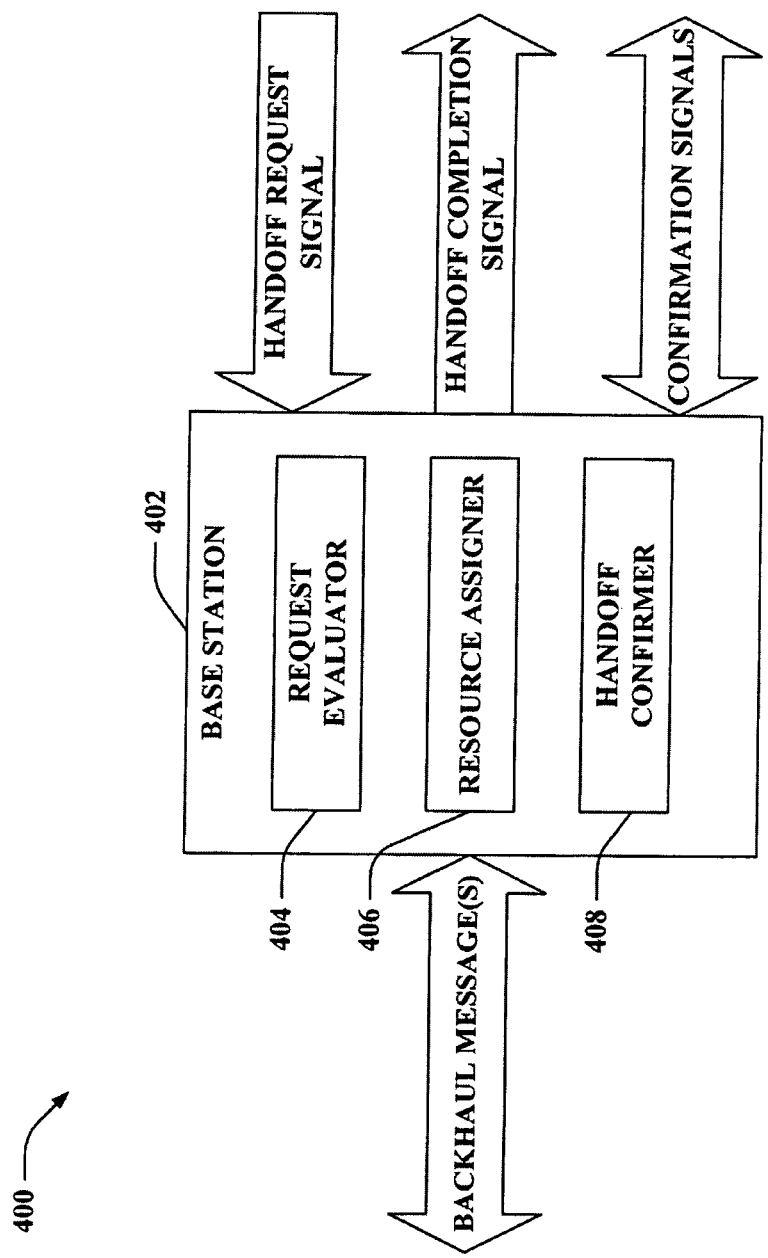
FIG. 4 is an illustration of an example system that supports handing off while mitigating error related to false detection of handoff completion signals in a wireless communication environment.

With reference to FIG. 4, illustrated is a system 400 that supports handing off while mitigating error related to false detection of handoff completion signals in a wireless communication environment. System 400 includes a base station 402 that can transmit and/or receive information, signals, data, instructions, commands, bits, symbols, and the like to and/or from one or more access terminals (not shown) (e.g., access terminal 202 of FIG. 2, . . . ). Further, base station 402 can transfer and/or obtain information, signals, data, instructions, commands, bits, symbols, and the like to and/or from disparate base station(s), network node(s), and the like.

Base station 402 can include a request evaluator 404, a resource assigner 406, and a handoff confirmer 408. For instance, base station 402 can receive a handoff request signal from an access terminal (not shown) being served by a disparate base station (not shown); thus, base station 402 is in a Non-Serving state with regards to the access terminal that sent the handoff request signal. Request evaluator 404 analyzes the obtained handoff request signal. By way of illustration, request evaluator 404 can determine an identity of the access terminal that sent the handoff request signal based upon such analysis of the handoff request signal. According to a further example, request evaluator 404 can determine resources requested as part of the handoff request signal.

Resource assigner 406 can allocate resources to the access terminal as a function of the handoff request signal. For instance, resource assigner 406 can determine whether to serve the access terminal. Moreover, resource assigner 406 can select resources to allot to the access terminal. By way of illustration, resource assigner 406 assigns non-zero tiles in RLAB, FLAB, etc. Further, resource assigner 406 generates and/or sends a handoff completion signal to the access terminal. The handoff completion signal includes information pertaining to resource allotment yielded by resource assigner 406. Further, base station 402 (e.g., request evaluator 404, resource assigner 406, handoff conformer 408, . . . ) can send a backhaul message to disparate base station(s) (e.g., source base station, previous serving base station for the access terminal, . . . ) that provides notification related to the access terminal handing off to base station 402. For instance, this backhaul message can be transmitted upon receiving the handoff request signal, determining to serve the access terminal from which the handoff request signal was received, transmitting the handoff completion signal, and/or the like. According to another example, a backhaul message that provides notification related to completion of the handoff can be sent to the disparate base station(s); however, the claimed subject matter is not so limited.

Moreover, handoff confirmer 408 can enable the access terminal to complete handoff such that the access terminal is served by base station 402 and/or determine whether handoff is successfully completed for the access terminal. For instance, upon sending the handoff completion signal, base station 402 can transition to a Confirm Handoff state. While in Confirm Handoff state, handoff confirmer 408 can send a forward link confirmation signal to the access terminal (e.g., transmit a FL packet, ACK to a RL packet, . . . ). According to an example, handoff confirmer 408 can monitor the reverse link for a reverse link confirmation signal sent by the access terminal (e.g., a RL packet, an ACK to a FL packet, . . . ). Following this example, when handoff confirmer 408 detects the reverse link confirmation signal, base station 402 can be transitioned to a Serving state. Pursuant to another example, handoff confirmer 408 can transition base station 402 to the Serving state prior to receiving the reverse link confirmation signal from the access terminal (e.g., transition to Serving state upon transmitting the forward link confirmation signal, . . . ) since backhaul based procedures can account for error resulting from false detection of handoff at base station 402. Thus, in accordance with this example, the reverse link confirmation signal may, but need not, be sent by the access terminal (e.g., confirmation at base station 402 can be optional, . . . ). Alternatively, base station 402 can obtain a backhaul message while in Confirm Handoff state, and based upon such message, base station 402 can return to Non-Serving state. Moreover, when in Serving state, base station 402 can receive a backhaul message that initiates a transition of base station 402 to Non-Serving state: from Serving state.

According to the depicted example, handoff confirmer 408 can lack a timer. Thus, base station 402 can remain in Confirm Handoff state indefinitely if there is no data activity. However, it is also contemplated that handoff confirmer 408 can include a timer similar to timer 208 utilized in access terminal 202 of FIG. 2. Hence, pursuant to this example, the timer can begin tracking an amount of elapsed time upon base station 402 transitioning to Confirm Handoff state, and if the amount of elapsed time exceeds a threshold before receiving a reverse link confirmation signal, then base station 402 can be returned to Non-Serving state.

Figure 5:
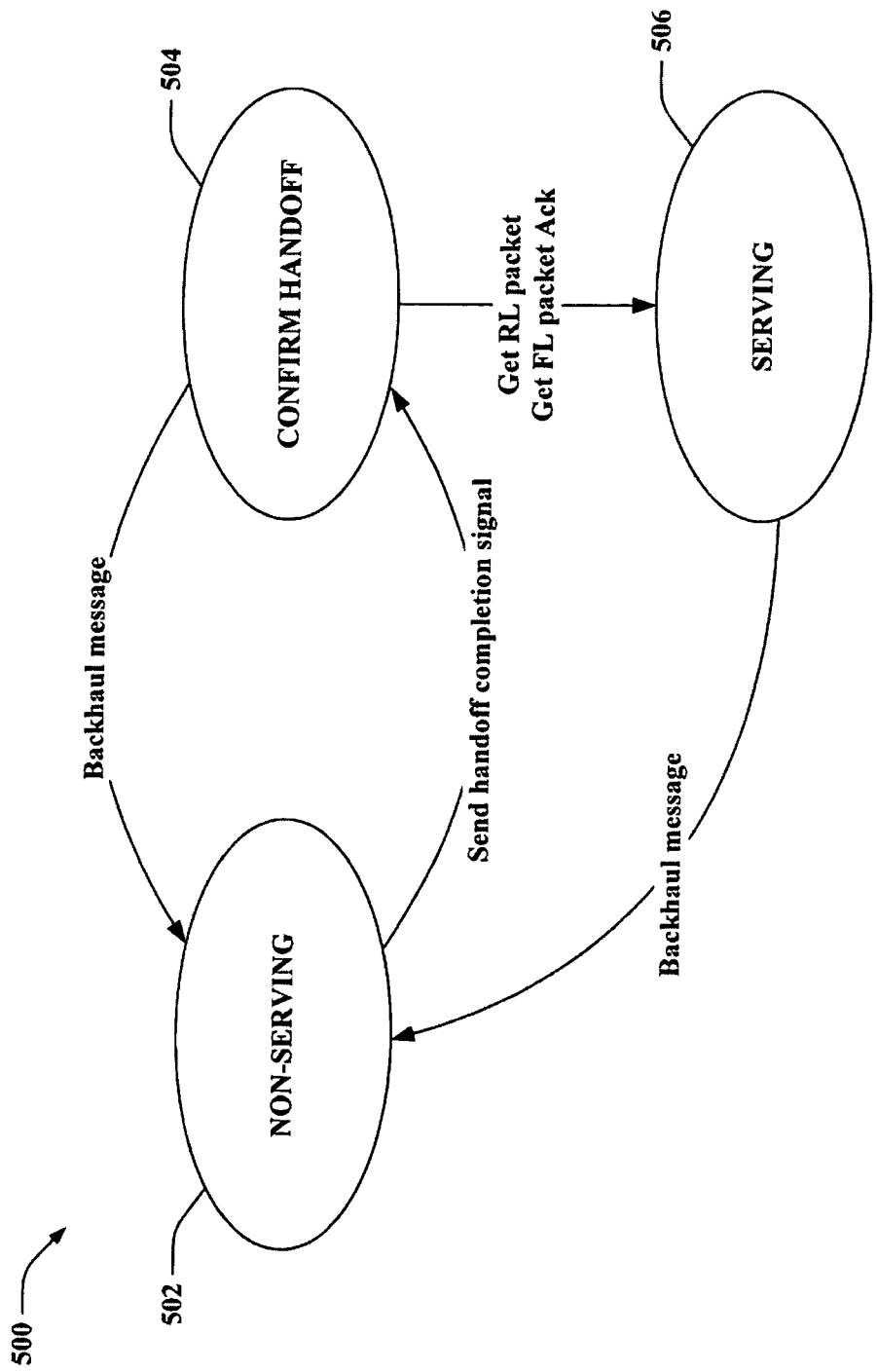
FIG. 5 is an illustration of an example base station state diagram in accordance with various aspects of the subject disclosure.

Turning to FIG. 5, illustrated is an example base station state diagram 500. For example, state diagram 500 can represent states and transitions between states associated with base station 402 of FIG. 4. State diagram 500 includes three states: namely, Non-Serving state 502, Confirm Handoff state 504, and Serving state 506. State diagram 500 includes Confirm Handoff state 504 (e.g. a typical Serving state can be split into Confirm Handoff state 504 and Serving state 506, . . . ), which is commonly lacking for conventional techniques.

In Non-Serving state 502, a base station can receive a handoff request signal from an access terminal desiring to handoff to that particular base station. Further, the base station can allocate resources to the requesting access, terminal and/or transmit a handoff completion signal indicating such resource allocation to the requesting access terminal. For instance, the base station can assign non-zero tiles (e.g., non-zero number of resources, . . . ) in the handoff completion signal (e.g., RLAB, FLAB, . . . ) sent to requesting access terminal. Assignment of a non-zero number of resources to the access terminal enables the terminal to send a full data packet (e.g., reverse link confirmation signal, . . . ), which is protected by a full. CRC (e.g., 24 bits of CRC, . . . ); the full data packet can be used to confirm handoff.

Upon sending the handoff completion signal, the base station can switch from Non-Serving state 502 to Confirm Handoff state 504. In Confirm Handoff state 504, the base station can send RLAB/FLAB based on REQ reception or FL data buffer. Further, for Access based handoff, FLAB or RLAB can be sent with non-zero tiles (e.g. non-zero number of resources, . . . ) upon entering Confirm Handoff state 504. Moreover, Confirm Handoff state 504 need not be associated with a timer; thus, the base station can remain in Confirm Handoff state 504 indefinitely if there is no data activity. Further, the base station can receive a backhaul message that causes the base station to transition back to Non-Serving state 504 from Confirm Handoff state 504. It is to be appreciated, however, that a timer can be utilized to track an amount of time that has passed since the base station entered Confirm Handoff state 504, and if the amount of time exceeds a threshold prior to transitioning to Serving state 506, then the base station returns to Non-Serving state 502.

Moreover, while in Confirm Handoff state 504, the base station can transmit a forward link confirmation signal that can be used by the requesting access terminal to confirm the handoff. The forward link confirmation signal can be a FL packet, an ACK to a RL packet, and so forth. Further, the base station can monitor the reverse link for a reverse link confirmation signal sent by the requesting access terminal. The reverse link confirmation signal can be a RL packet, an ACK to a FL packet, and the like. If the reverse link confirmation signal is received, then the base station can transition from Confirm Handoff state 504 to Serving state 506; however, confirmation at the base station can be optional since backhaul based procedures can account for false detection of handoff at the base station.

While in Serving state 506, the base station can provide connectivity to the access terminal, control power of the access terminal, and the like. Moreover, a backhaul message can be obtained while in Serving state 506, where the backhaul message causes the base station to switch to Non-Serving state 502 (e.g., the backhaul message can indicate that the access terminal has handed off to a differing base station, . . . ). Further, when in Non-Serving state 502, the base station does not provide connectivity, power control, and so forth for the access terminal.

Figure 6:
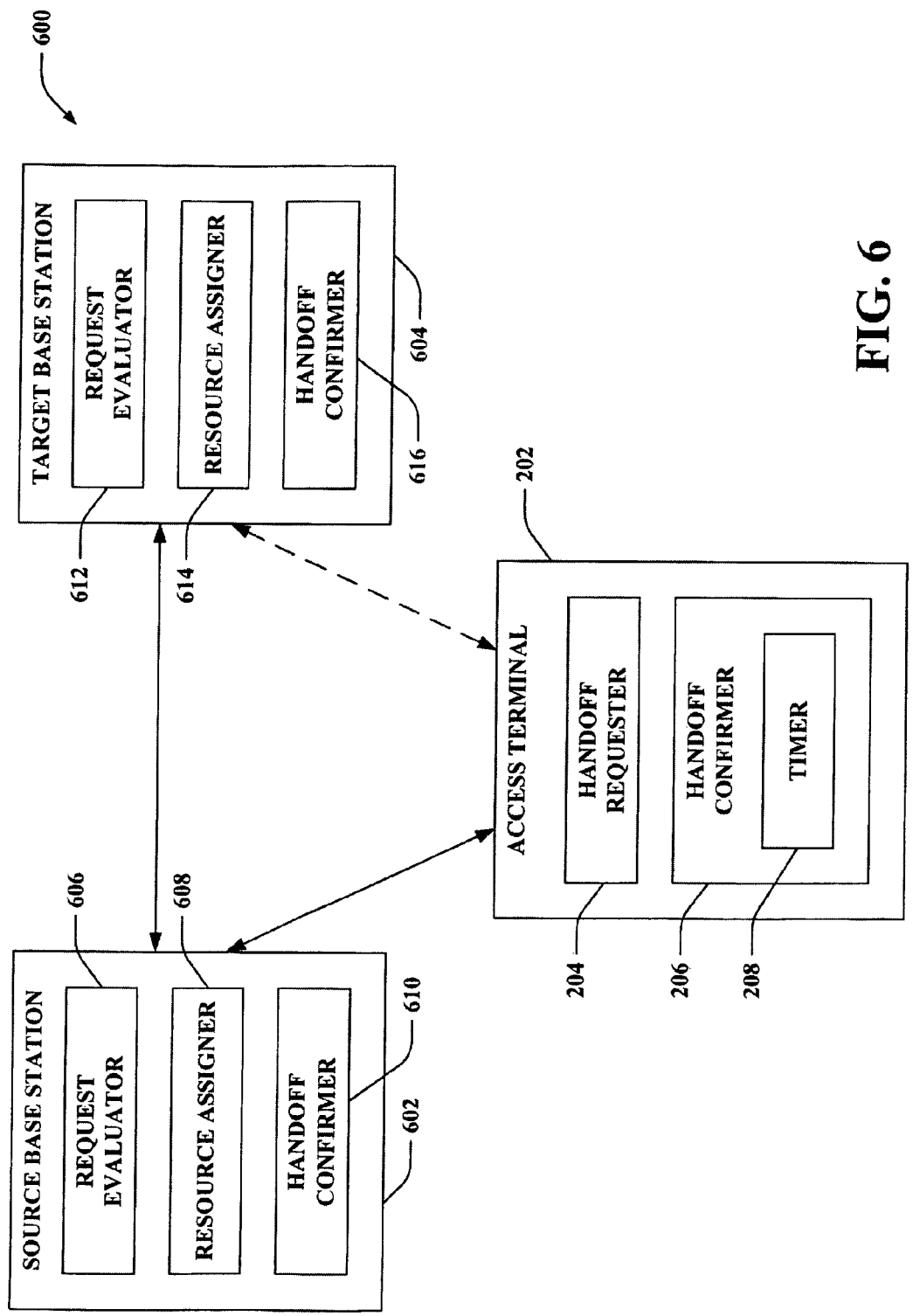
FIG. 6 is an illustration of an example system that enables compensating for handoff completion signal detection error in a wireless communication environment.

With reference to FIG. 6, illustrated is a system 600 that enables compensating for handoff completion signal detection error in a wireless communication environment. System 600 includes access terminal 202, a source base station 602 and a target base station 604. Source base station 602 and target base station 604 can each be substantially similar to base station 402 of FIG. 4. Further, although not shown, it is to be appreciated that system 600 can include substantially any number of access terminals in addition to access terminal 202 and/or substantially any number of base stations in addition to source base station 602 and target base station 604.

Access terminal 202 can include handoff requester 204 and handoff confirmer 206, which further comprises timer 208. Moreover, source base station 602 can include a request evaluator 606, a resource assigner 608, and a handoff confirmer 610 and target base station 604 can include a request evaluator 612, a resource assigner 614 and a handoff confirmer 616. Request evaluators 606 and 612 can each be substantially similar to request evaluator 404 of FIG. 4, resource assigners 608 and 614 can each be substantially similar to resource assigner 406 of FIG. 4, and handoff confirmers 610 and 616 can each be substantially similar to handoff confirmer 408 of FIG. 4. Although the following describes handoff from source base station 602 to target base station 604, it is to be appreciated that access terminal 202 can handoff to source base station 602 (e.g., source base station 602 can be a target, . . . ) and/or access terminal 202 can handoff from target base station 604 (e.g., target base station 602 can be a source, . . . ).

According to an illustration, source base station 602 can serve access terminal 202 during a given time period. For instance, source base station 602 can provide connectivity for access terminal 202, control power of access terminal 202, and the like. Thereafter, access terminal 202 can yield a decision to handoff to target base station 604. Upon generating such handoff decision, handoff requester 204 can generate and send a handoff request signal to target base station 604, where the handoff request signal can be specific to access terminal 202 (e.g. the handoff request signal can be a function of a unique identifier corresponding to access terminal 202, the handoff request signal can include information that can be employed by target base station 604 to distinguish access terminal 202 from disparate access terminal(s) (not shown), . . . ). Request evaluator 612 of target base station 604 can review the handoff request signal and determine whether to grant the handoff request. If target base station 604 decides to grant the handoff request, resource assigner 614 can allocate resources to access terminal 202. Further, resource assigner 614 can yield and/or transmit a handoff completion signal to access terminal 202. For instance, the handoff completion signal can include a 16 bit CRC; however, the claimed subject matter is not so limited. Upon sending the handoff completion signal, handoff confirmer 616 of target base station 604 can monitor for a reverse link confirmation signal from access terminal 202 and/or transmit a forward link confirmation signal to access terminal 202. Further, when access terminal 202 obtains the handoff completion signal, handoff confirmer 206 of access terminal 202 can monitor for a forward link confirmation signal from target base station 604 and/or transmit a reverse link confirmation signal to target base station 604. Moreover, timer 208 can initiate tracking an amount of elapsed time upon receiving the handoff completion signal; thus, if the forward link confirmation signal fails to be received prior to expiration of a threshold amount of time as determined by timer 208, then handoff confirmer 206 can recognize that handoff to target base station 604 failed. Alternatively, if the forward link confirmation signal is received prior to expiration of the threshold amount of time, then handoff confirmer 206 can determine that the handoff to target base station 604 was successfully completed.

By way of further illustration, source base station 602 and target base station 604 can communicate backhaul messages therebetween (e.g., directly, indirectly through one or more network nodes, . . . ). For instance, when handoff confirmer 616 recognizes a successful handoff to target base station 604 (e.g., upon receiving the reverse link confirmation signal, . . . ), target base station 604 can transfer a backhaul message to source base station 602 which indicates that access terminal 202 is being served by target base station 604; thus, source base station 602 can enter Non-Serving state. According to another example, when access terminal 202 fails to obtain a forward link confirmation signal prior to expiration of the threshold amount of time as recognized by timer 208, access terminal 202 can retry to handoff to target base station 604, initiate handoff to a disparate base station (not shown), continue to be served by source base station 602, and so forth. If access terminal 202 continues to be served by source base station 602 (or hands off to a disparate base station), then source base station 602 (or the disparate base station) can send a backhaul message to target base station 604; this backhaul message can indicate that access terminal 202 is being served by source base station 602 (or the disparate base station). In response to receipt of this backhaul message, target base station 604 can transition from Confirm Handoff state to Non-Serving state.

Aspects of the claimed subject matter enable mitigating the error case where access terminal 202 proceeds as if handoff is complete, while target base station 604 proceeds as if it is non-serving. Accordingly, system 600 utilizes a two-step technique before access terminal 202 can conclude that the handoff is complete. For instance, a probability of false handoff completion signal detection associated with the first step can be of the order $10^{-4}$. Further, a probability of false ACK to RL packet detection or false FL packet detection can be of the order $10^{-3}$. Thus, the combined probability can be $10^{-7}$, which can be an improved rate to enter the error scenario as compared to common techniques.

In contrast, conventional recovery from the false handoff completion signal detection error scenario can be as follows. At the access terminal, the access terminal has RL data, it can send an REQ and get no response, which can result in a data layer failure (e.g., RLsupervision failure, . . . ). Further, if the access terminal does not have RL data, it can stay in limbo until expiration of a keep alive timer (e.g., the keep alive timer can be 10 seconds, . . . ), when the access terminal can generate a RL signaling KeepAlive message (e.g., every 10 seconds, . . . ). At the base station, the base station which thinks it is serving can declare supervision failure due to FL/RL packet errors or low Reverse Pilot Channel (R-PICH). Moreover, the other base stations are informed of the supervision failure through backhaul messaging.

Figure 7:
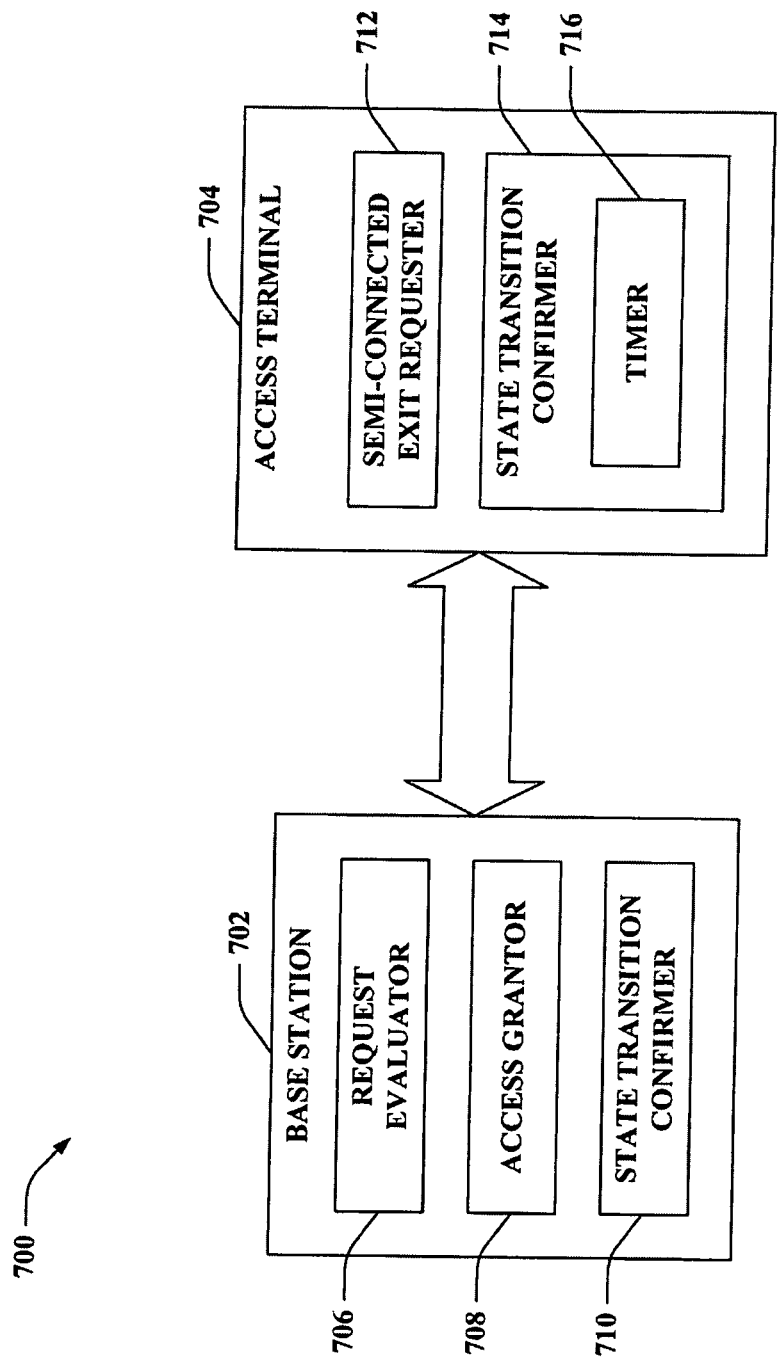
FIG. 7 is an illustration of an example system that enables confirming an access grant utilized for transitioning from a semi-connected state in a wireless communication environment.

Now turning to FIG. 7, illustrated is a system 700 that enables confirming an access grant utilized for transitioning from a semi-connected state in a wireless communication environment. System 700 can employ a similar two-step confirmation technique as described above in conjunction with handing off between base stations. System 700 includes a base station 702 and an access terminal 704; however, it is to be appreciated that system 700 can include substantially any number of base stations similar to base station 702 and/or substantially any number of access terminals similar to access terminal 704. Further, system 700 can be a Long Term Evolution (LTE) based system; however, the claimed subject matter is not so limited.

Base station 702 can include a request evaluator 706, an access grantor 708, and a state transition confirmer 710, and access terminal 704 can include a semi-connected exit requester 712 and a state transition confirmer 714, which can further comprise a timer 716. Access terminal 704 can employ a semi-connected state in order to save battery life. While in semi-connected state, access terminal 704 can stop being directly power controlled, access terminal 704 can inhibit time tracking and/or time aligning with a network, and access terminal 704 can shut down an associated receiver and transmitter. Further, access terminal 704 can re-enter connected state from semi-connected state without needing to reestablish a context and/or identity of access terminal 704. For instance, when access terminal 704 transitions to semi-connected state from connected state, base station 702 can maintain a Media Access Control identifier (MAC ID) associated with access terminal 704. Thus, the MAC ID need not be reassigned upon re-entering connected state from semi-connected state.

In order to quickly transition to connected state from semi-connected state, semi-connected exit requester 712 of access terminal 704 can initiate an exit sequence. For example, semi-connected exit requester 712 can send a signal reserved for access terminal 704 that notifies base station 702 that access terminal 704 desires to reconnect. Each access terminal can be allocated a respective reserved signal to be utilized for re-entry, thus mitigating contention for resources as well as allowing for recovery of access terminal specific context stored by base station 702.

Semi-connected exit requester 712 transfers the reserved signal pertaining to access terminal 704 to base station 702 for transitioning to connected state from semi-connected state. Request evaluator 706 reviews the reserved signal and determines an identity and/or context associated with access terminal 704 based upon such review. Thereafter, access grantor 708 can reply to the reserved signal by transmitting an access grant, which indicates that base station 702 has recognized, permitted, etc. the request of access terminal 704. Access terminal 704 can monitor the forward link for the access grant; however, the access grant can be susceptible to false detection by access terminal 704 (e.g., in a similar manner as compared to false detection of a handoff completion signal as described herein, . . . ).

Upon detecting the access grant at access terminal 704, timer 716 can track an amount of elapsed time and compare this amount of time to a threshold. Further, state transition confirmer 714 of access terminal 704 can monitor the forward link for a forward link confirmation signal sent by state transition confirmer 710 of base station 702 (e.g., access terminal 704 can be in a confirmation state during this time period, . . . ). If state transition confirmer 714 detects the forward link confirmation signal prior to expiration of timer 716, then access terminal 704 can complete the transition to connected state. Alternatively, if state transition confirmer 714 fails to detect the forward link confirmation signal before expiration of timer 716, then access terminal 704 can return to semi-connected state (e.g., re-entry to connected state can fail under such a scenario, . . . ).

Moreover, state transition confirmer 714 of access terminal 704 can transmit a reverse link confirmation signal to base station 702. After sending the access grant, state transition confirmer 710 of base station 702 can monitor for the reverse link confirmation signal transferred from access terminal 704. If the reverse link confirmation signal is detected by state transition conformer 710, then base station 702 can recognize that access terminal 704 has successfully re-entered connected state. Alternatively, if the reverse link confirmation signal fails to be detected by state transition confirmer 710, then base station 702 can continue to deal with access terminal 704 as though it is in semi-connected state. Further, although not shown, it is contemplated that state transition confirmer 710 can include a timer similar to timer 716 of access terminal; however, the claimed subject matter is not so limited.

Figure 8:
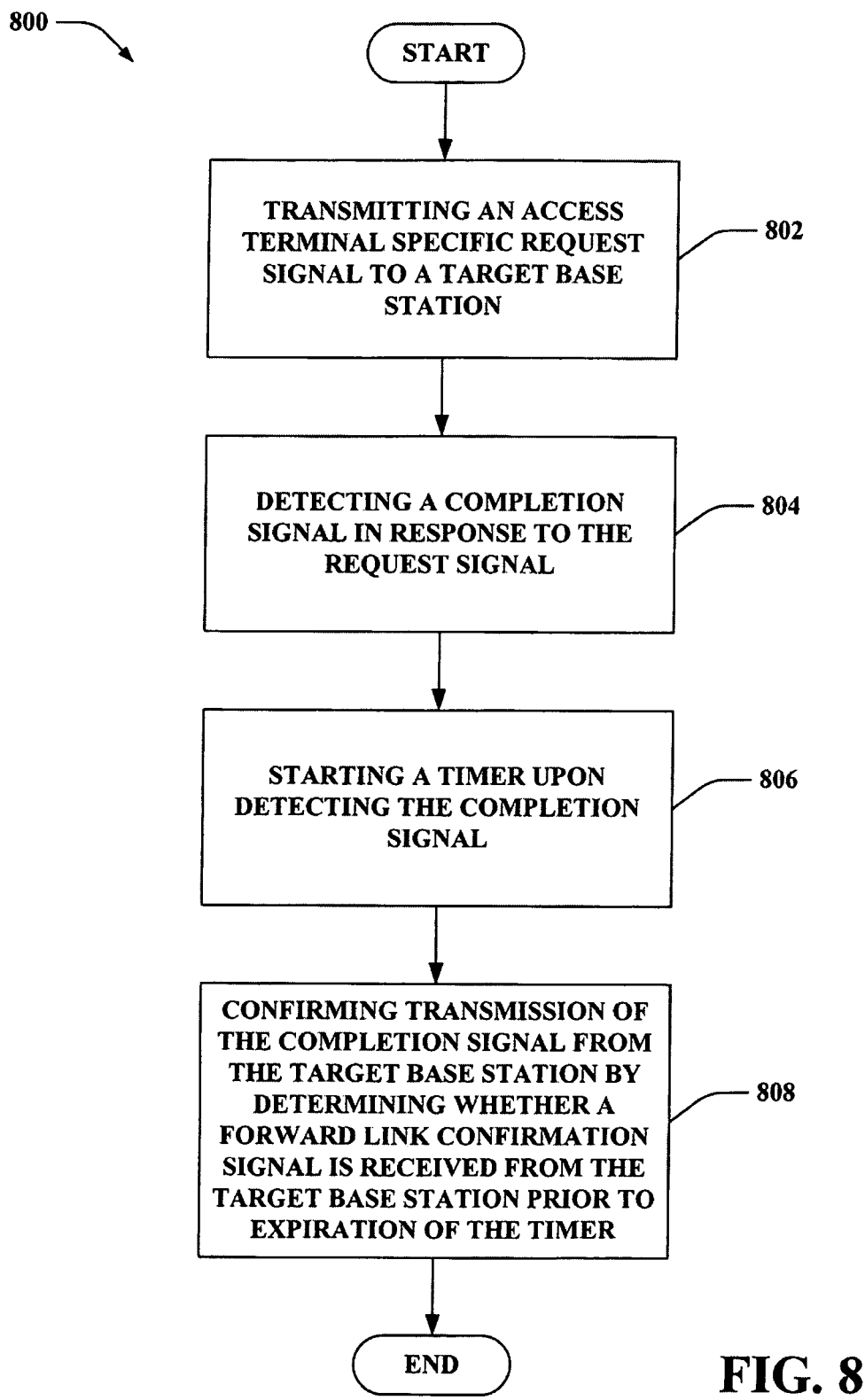
FIG. 8 is an illustration of an example methodology that facilitates mitigating error associated with false detection of completion signals in a wireless communication environment.
Figure 9:
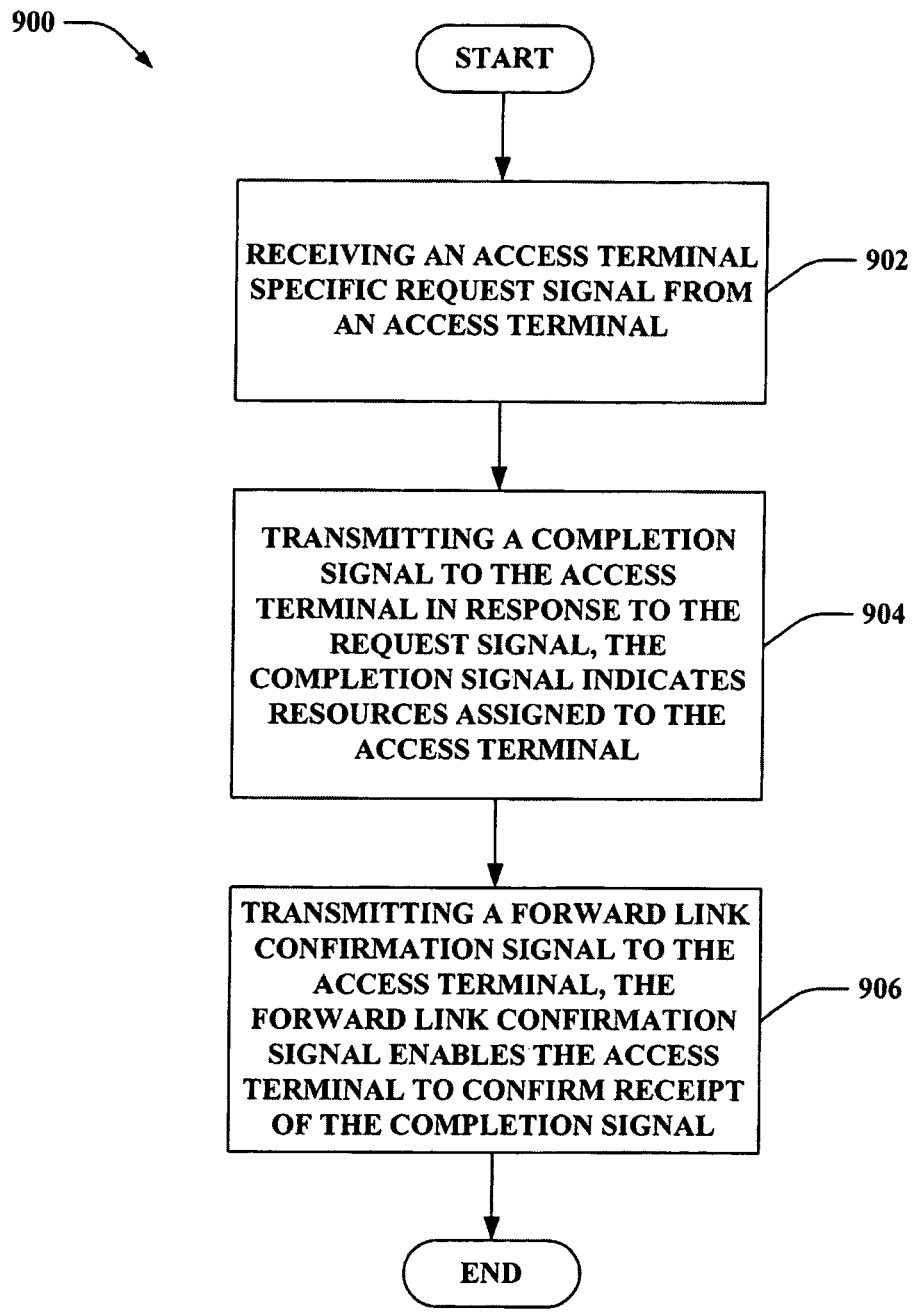
FIG. 9 is an illustration of an example methodology that facilitates recovering from false completion signal detection in a wireless communication environment.

Referring to FIGS. 8-9, methodologies relating to mitigating error due to false completion signal detection in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 8, illustrated is a methodology 800 that facilitates mitigating error associated with false detection of completion signals in a wireless communication environment. At 802, an access terminal specific request signal can be transmitted to a target base station. For example, the request signal can be a handoff request signal. Following this example, a decision can be made to handoff from a source base station to the target base station and the access terminal can switch to a Try to Handoff state; the handoff request signal can be sent to the target base station while in Try to Handoff state. According to another illustration, the request signal can be a reserved signal utilized by the access terminal to re-enter a connected state from a semi-connected state. Further, the request signal can include information pertaining to an identity of the access terminal, which can enable the target base station to discern the identity of the access terminal based upon an analysis of the request signal. By way of further illustration, the access terminal specific request signal can be transmitted with non-zero buffer size even if a buffer associated with an access terminal is empty when request (REQ) based handoff is utilized. At 804, a completion signal in response to the request signal can be detected. The completion signal, for instance, can be a handoff completion signal. Examples of handoff completion signals include a reverse link assignment block (RLAB), a forward link assignment block (FLAB), an AccessGrant, or the like. Moreover, in the context of semi-connected exit, the completion signal can be an AccessGrant.

At 806, a timer can be started upon detecting the completion signal. Further, the access terminal can transition to a confirmation state (e.g., Confirm Handoff state, Confirm Reentry state, . . . ) when the completion signal is detected. At 808, transmission of the completion signal from the target base station can be confirmed by determining whether a forward link confirmation signal is received from the target base station prior to expiration of the timer. The timer can expire at a threshold time duration (e.g., 50 ms, . . . ), where the threshold time duration can be preset, dynamically allocated, and so forth. The forward link confirmation signal can indicate that handoff to the target base station has been successful or re-entry to connected state from semi-connected state has been successful. Moreover, a reverse link confirmation signal can be transmitted to the target base station to enable the target base station to recognize that handoff has successfully been completed or the access terminal has successfully re-entered connected state from semi-connected state. The forward link confirmation signal can be a forward link packet or an acknowledgement to a reverse link packet, while the reverse link confirmation signal can be a reverse link packet or an acknowledgement to a forward link packet; as such, the forward link confirmation signal and the reverse link confirmation signal can include more cyclic redundancy check (CRC) bits (e.g., 24 bits of CRC for the confirmation signals, . . . ) as compared to the completion signal (e.g., 16 bits of CRC for the completion signal, . . . ).

Pursuant to another example, the access terminal can return to a Try to Handoff state upon determining that the timer expired prior to receipt of the forward link confirmation signal. Further, when the forward link confirmation signal is not received, reconfirmation can be performed. For instance, if handoff was initiated by transmitting access probes, then access probes can be transmitted again when effectuating reconfirmation. Moreover, if handoff was initiated by transmitting either a channel quality indicator (CQI) signal or a request (REQ) signal, then a CQI signal or a REQ signal can continue to be transmitted when performing reconfirmation.

Now turning to FIG. 9, illustrated is a methodology 900 that facilitates recovering from false completion signal detection in a wireless communication environment. At 902, an access terminal specific request signal can be received from an access terminal. The request signal can be handoff request signal or a reserved signal used by the access terminal for exiting semi-connected state. Further, the request signal can be analyzed to determine an identity of the access terminal, a context associated with the access terminal, or the like. By way of illustration, the request signal can be obtained while a base station is in Non-Serving state; however, the claimed subject matter is not so limited. At 904, a completion signal can be transmitted to the access terminal in response to the request signal. The completion signal, for instance, can indicate resources assigned to the access terminal. For example, non-zero amounts of resources (e.g., non-zero tiles, . . . ) can be allocated in the completion signal. Further, upon sending the completion signal, the base station can transition to a confirmation state (e.g., Confirm Handoff state, Confirm Reentry state, . . . ). The completion signal, for instance, can be a handoff completion signal. Examples of handoff completion signals include a reverse link assignment block (RLAB), a forward link assignment block (FLAB), an AccessGrant, and so forth. Moreover, in the context of semi-connected exit, the completion signal can be an AccessGrant. According to another illustration, the completion signal can be transmitted to the access terminal irrespective of buffer data included in the request signal.

At 906, a forward link confirmation signal can be transmitted to the access terminal. The forward link confirmation signal can enable the access terminal to confirm receipt of the completion signal. Based upon this confirmation, the access terminal can transition to Handoff Complete state or connected state. For example, the forward link confirmation signal can be a forward link assignment block (FLAB), an acknowledgement (ACK) to a reverse link packet, and so forth. Moreover, a reverse link confirmation signal can be received from the access terminal; upon obtaining the reverse link confirmation signal, the base station can recognize that the access terminal is being served by the base station (under the handoff scenario) (e.g., the base station can transition to Serving state, . . . ) or the access terminal has returned to connected state (under the semi-connected exit scenario).

Further, backhaul messages can be received that can be utilized to vary base station state. For instance, when in Serving state, a backhaul message can be obtained that notifies the base station that a disparate base station is serving the access terminal; thus, the base station can switch to Non-Serving state. By way of further illustration, when in Confirm Handoff state a backhaul message can be received that indicates to the base station that a disparate base station is serving the access terminal, and hence, the base station can transition to Non-Serving state.

It will be appreciated that, in accordance with one or more aspects described herein, inferences can be made regarding recovering from false detection of completion signals. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences pertaining to determining an identity of an access terminal based upon information included in an access terminal specific request signal. By way of further illustration, an inference can be made related to determining an amount of resources to allocate to an access terminal that can be indicated as part of a completion signal sent to the access terminal. It will be appreciated that the foregoing examples are illustrative in nature and are not intended to limit the number of inferences that can be made or the manner in which such inferences are made in conjunction with the various embodiments and/or methods described herein.

Figure 10:
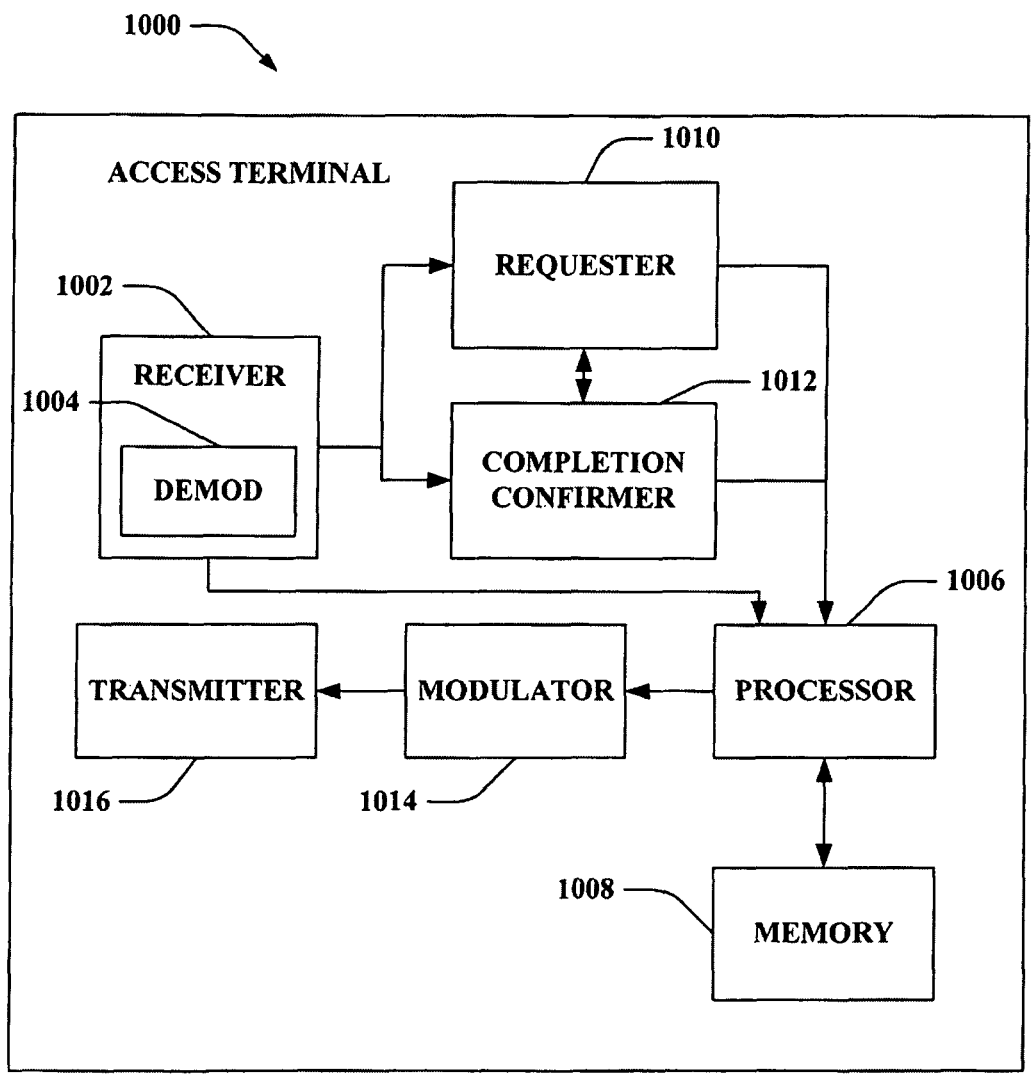
FIG. 10 is an illustration of an example access terminal that recovers from erroneous completion signal detection in a wireless communication system.

FIG. 10 is an illustration of an access terminal 1000 that recovers from erroneous completion signal detection in a wireless communication system. Access terminal 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of access terminal 1000, and/or a processor that both analyzes information received by receiver 1002, generates information for transmission by transmitter 1016, and controls one or more components of access terminal 1000.

Access terminal 1000 can additionally comprise memory 1008 that is operatively coupled to processor 1006 and that can store data to be transmitted, received data, and any other suitable information related to performing the various actions and functions set forth herein. Memory 1008, for instance, can store protocols and/or algorithms associated with confirming handoff or semi-connected exit completion.

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Receiver 1002 is further operatively coupled to a requester 1010 and/or a completion confirmer 1012. Requester 1010 can be substantially similar to handoff requester 204 of FIG. 2 and/or semi-connected exit requester 712 of FIG. 7. Moreover, completion confirmer 1012 can be substantially similar to handoff conformer 206 of FIG. 2 and/or state transition confirmer 714 of FIG. 7. Requester 1010 can generate and/or transmit a request signal (e.g., handoff request signal, reserved signal, . . . ) uniquely associated with access terminal 1000. For example, the request signal can include information pertaining to an identifier of access terminal 1000. Requester 1010 can send the request signal to effectuate handoff to a target base station and/or re-entry to connected state from semi-connected state. In response to the transmitted request signal, access terminal 1000 can detect (e.g., falsely, appropriately, . . . ) a completion signal (e.g., handoff completion signal, . . . ). To account for false detection of the completion signal, completion confirmer 1012 can monitor for a forward link confirmation signal from the target base station. Moreover, completion confirmer 1012 can transmit a reverse link confirmation signal to the target base station, which can be used by the target base station to verify success of the handoff or re-entry to connected state. Access terminal 1000 still further comprises a modulator 1014 and a transmitter 1016 that transmits the signal to, for instance, a base station, another access terminal, etc. Although depicted as being separate from the processor 1006, it is to be appreciated that requester 1010, completion confirmer 1012 and/or modulator 1014 can be part of processor 1006 or a number of processors (not shown).

Figure 11:
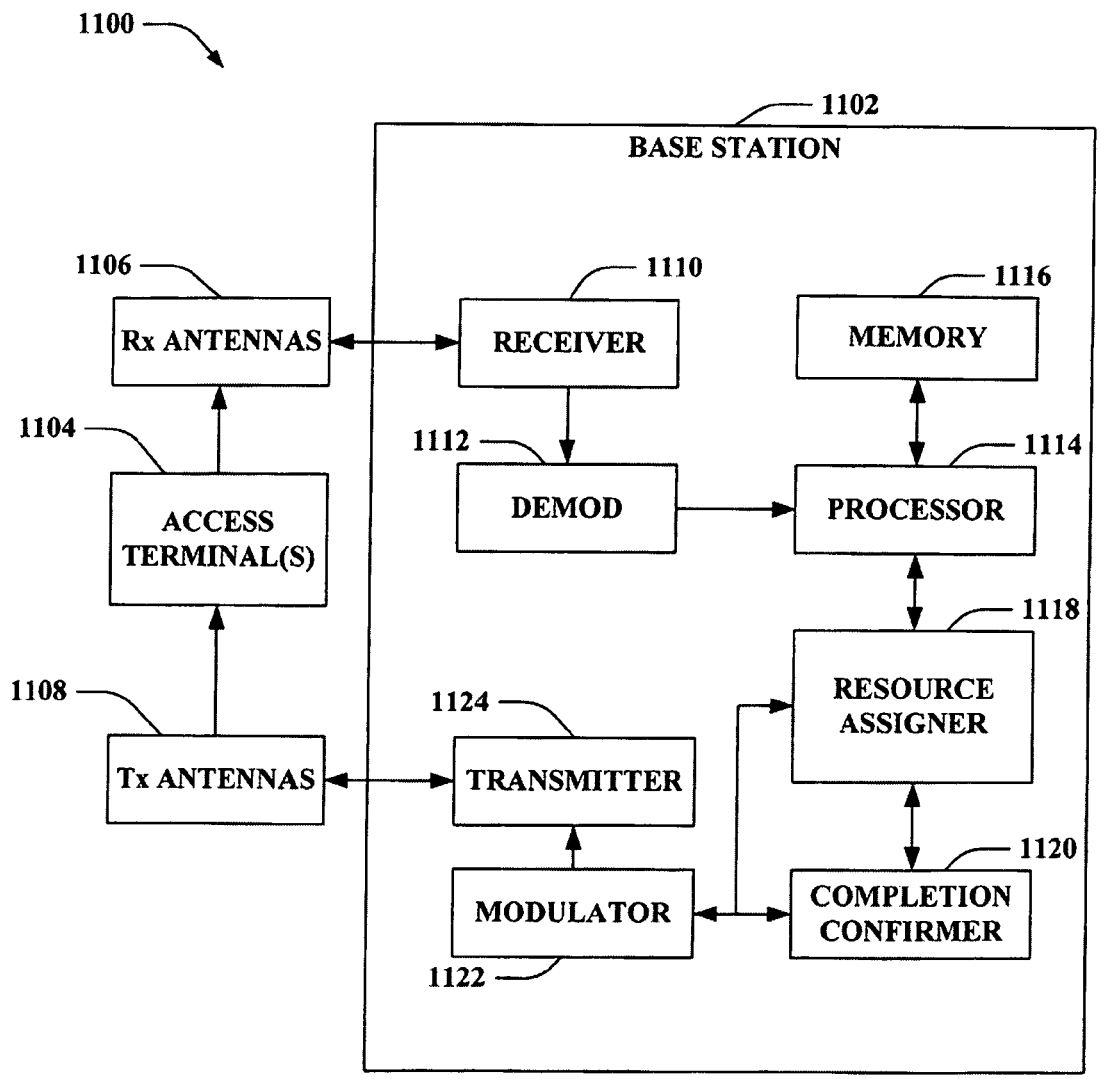
FIG. 11 is an illustration of an example system that facilitates mitigating false detection of completion signals in a wireless communication environment.

FIG. 11 is an illustration of a system 1100 that facilitates mitigating false detection of completion signals in a wireless communication environment. System 1100 comprises a base station 1102 (e.g., access point, . . . ) with a receiver 1110 that receives signal(s) from one or more access terminals 1104 through a plurality of receive antennas 1106, and a transmitter 1124 that transmits to the one or more access terminals 1104 through a transmit antenna 1108. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores data to be transmitted to or received from access terminal(s) 1104 (or a disparate base station (not shown)) and/or any other suitable information related to performing the various actions and functions set forth herein. Processor 1114 is further coupled to a resource assigner 1118 that allocates resources to access terminal(s) 1104 in response to respective, received request signal(s). Resource assigner 1118 can be operatively coupled to a completion confirmer 1120 that monitors for reverse link confirmation signals and/or generates forward link confirmation signals as described herein. It is contemplated that resource assigner 1118 can be substantially similar to resource assigner 406 of FIG. 4 and/or access grantor 708 of FIG. 7 and/or completion confirmer 1120 can be substantially similar to handoff confirmer 408 of FIG. 4 and/or state transition confirmer 710 of FIG. 7. Further, resource assigner 1118 and/or completion confirmer 1120 can provide information to be transmitted to a modulator 1122. Modulator 1122 can multiplex a frame for transmission by a transmitter 1124 through antennas 1108 to access terminal(s) 1104. Although depicted as being separate from the processor 1114, it is to be appreciated that resource assigner 1118, completion confirmer 1120 and/or modulator 1122 can be part of processor 1114 or a number of processors (not shown).

Figure 12:
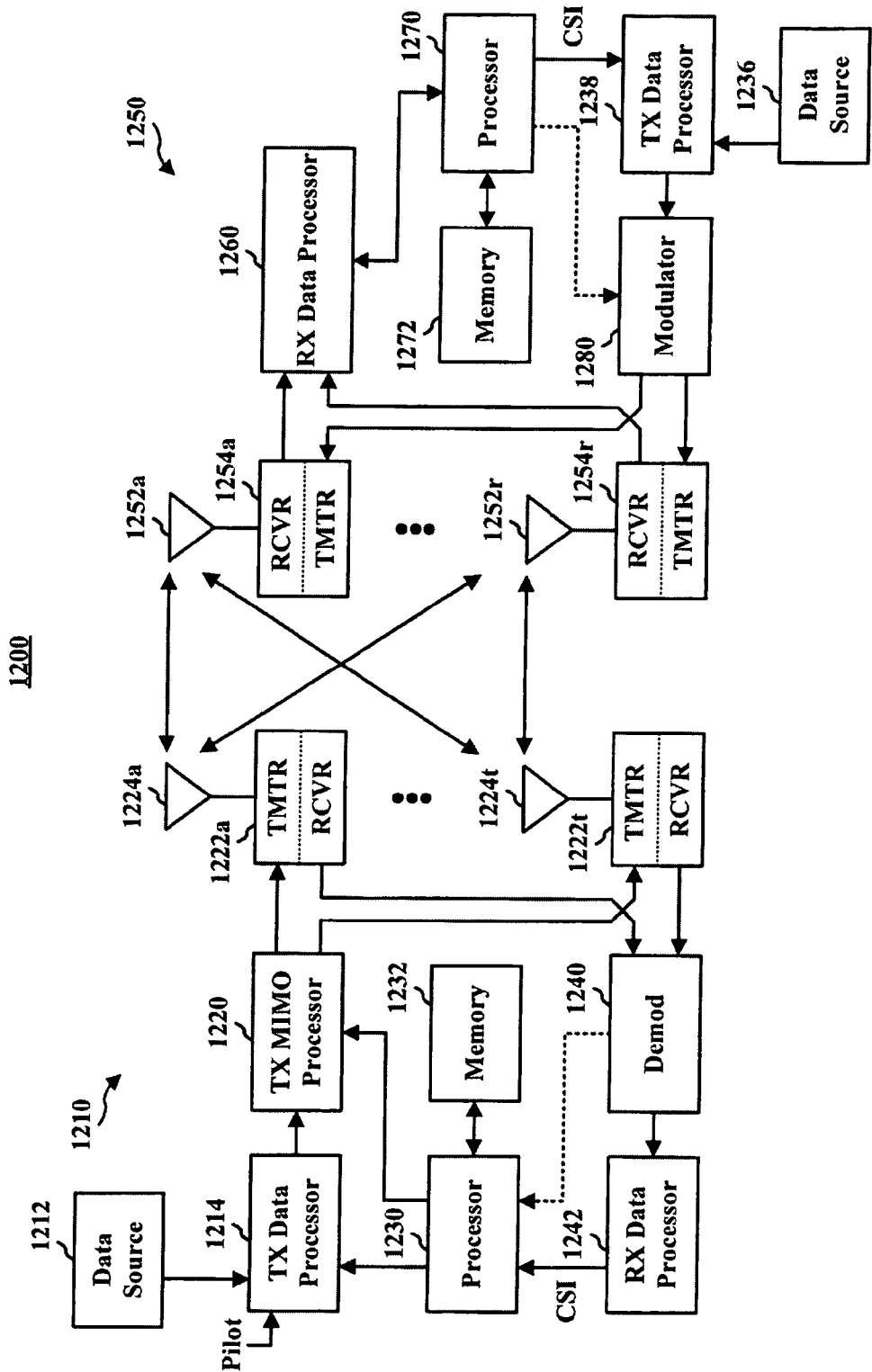
FIG. 12 is an illustration of an example wireless network environment that can be employed in conjunction with the various systems and methods described herein.

FIG. 12 shows an example wireless communication system 1200. The wireless communication system 1200 depicts one base station 1210 and one access terminal 1250 for sake of brevity. However, it is to be appreciated that system 1200 can include more than one base station and/or more than one access terminal, wherein additional base stations and/or access terminals can be substantially similar or different from example base station 1210 and access terminal 1250 described below. In addition, it is to be appreciated that base station 1210 and/or access terminal 1250 can employ the systems (FIGS. 1-2, 4, 6-7, 10-11, and 13-14) and/or methods (FIGS. 8-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g. for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At access terminal 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and down-converts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which available technology to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from access terminal 1250 are received by antennas 1224, conditioned by receivers 1222, demodulated by a demodulator 1240, and processed by a RX data processor 1242 to extract the reverse link message transmitted by access terminal 1250. Further, processor 1230 can process the extracted message to determine which precoding matrix to use for determining the beamforming weights.

Processors 1230 and 1270 can direct (e.g., control, coordinate, manage, etc.) operation at base station 1210 and access terminal 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ...) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
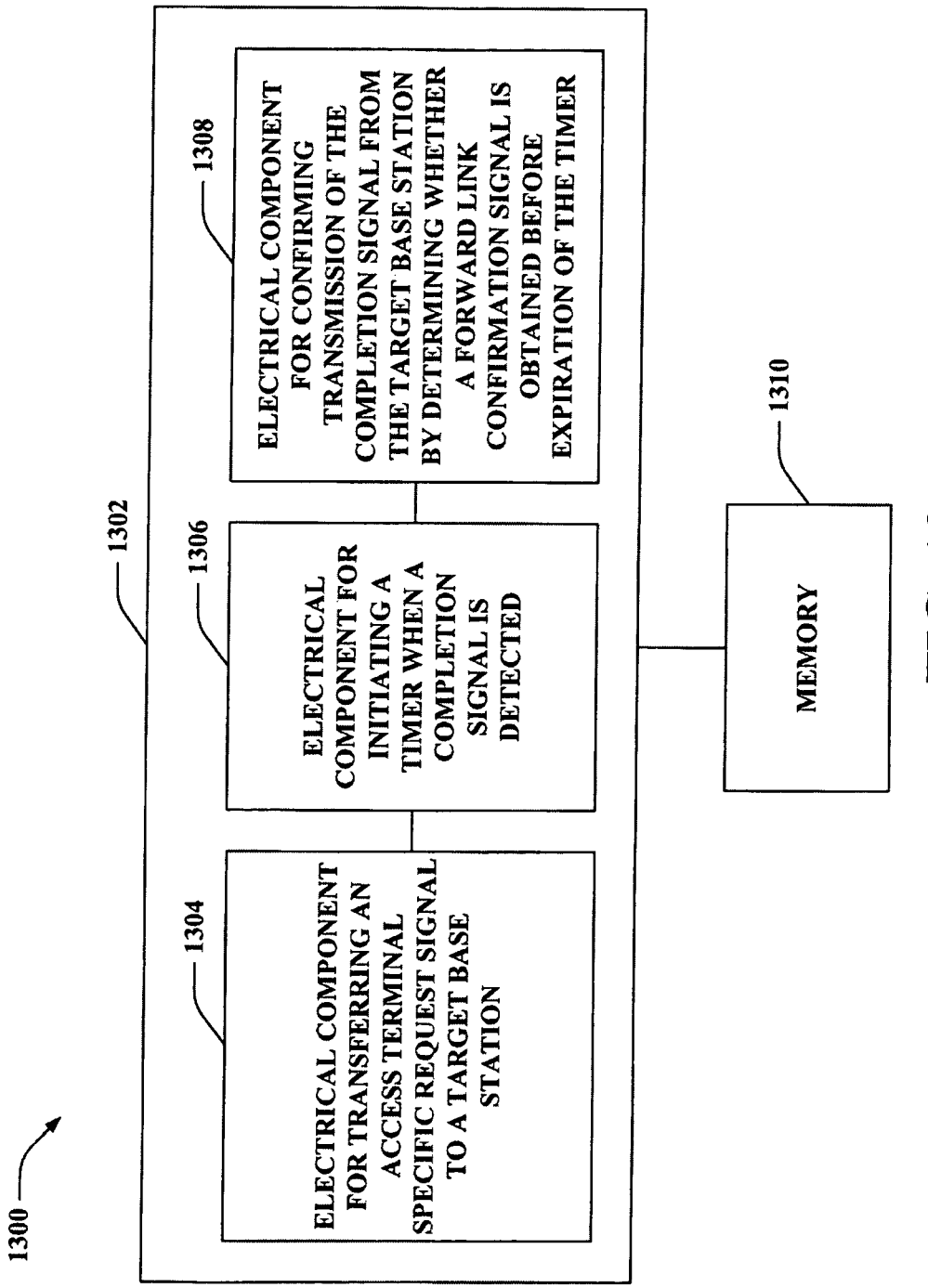
FIG. 13 is an illustration of an example system that enables utilizing an error recovery scheme in a wireless communication environment.

With reference to FIG. 13, illustrated is a system 1300 that enables utilizing an error recovery scheme in a wireless communication environment. For example, system 1300 can reside within an access terminal. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for transferring an access terminal specific request signal to a target base station 1304. The request signal, for example, can be utilized for handing off, transitioning from semi-connected state, and so forth. Further, logical grouping 1302 can include an electrical component for initiating a timer when a completion signal is detected 1306. Moreover, logical grouping 1302 can comprise an electrical component for confirming transmission of the completion signal from the target base station by determining whether a forward link confirmation signal is obtained before expiration of the timer 1308. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

Figure 14:
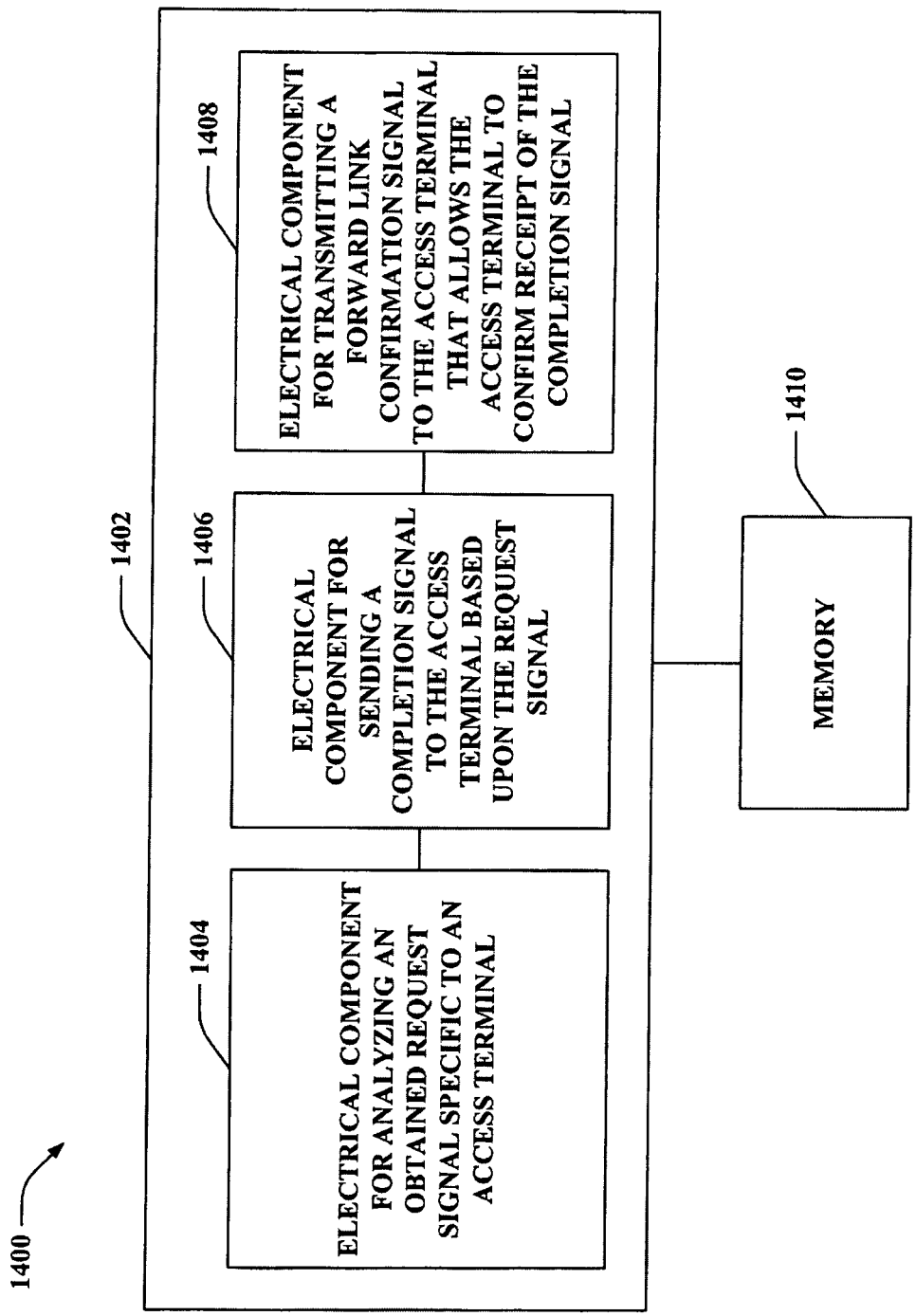
FIG. 14 is an illustration of an example system that enables mitigating error associated with false completion signal detection in a wireless communication environment.

Turning to FIG. 14, illustrated is a system 1400 that enables mitigating error associated with false completion signal detection in a wireless communication environment. System 1400 can reside at least partially within a base station, for instance. As depicted, system 1400 includes functional blocks that can represent functions implemented by a processor, software, or combination thereof (e.g., firmware). System 1400 includes a logical grouping 1402 of electrical components that can act in conjunction. Logical grouping 1402 can include an electrical component for analyzing an obtained request signal specific to an access terminal 1404. Further, logical grouping 1402 can include an electrical component for sending a completion signal to the access terminal based upon the request signal 1406. The completion signal, for instance, can indicate a resource allotment for the access terminal. Moreover, logical grouping 1402 can include an electrical component for transmitting a forward link confirmation signal to the access terminal that allows the access terminal to confirm receipt of the completion signal 1408.

Additionally, system 1400 can include a memory 1410 that retains instructions for executing functions associated with electrical components 1404, 1406, and 1408. While shown as being external to memory 1410, it is to be understood that electrical components 1404, 1406, and 1408 can exist within memory 1410.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method at an access terminal that facilitates mitigating error associated with false detection of completion signals in a wireless communication environment, comprising:
   transmitting an access terminal specific request signal to a target base station;
   detecting a completion signal in response to the access terminal specific request signal, wherein the completion signal is one of a reverse link assignment block, a forward link assignment block, or an access grant;
   starting a timer upon detecting the completion signal; and
   confirming transmission of the completion signal from the target base station by determining whether a forward link confirmation signal is received from the target base station prior to an expiration of the timer.

2. The method of claim 1, wherein the access terminal specific request signal is a handoff request signal.

3. The method of claim 2, further comprising:
   deciding to handoff from a source base station to the target base station; and
   transmitting the handoff request signal while in a Try to Handoff state.

4. The method of claim 1, wherein the access terminal specific request signal is a reserved signal utilized to re-enter a connected state from a semi-connected state.

5. The method of claim 4, wherein the completion signal is the access grant.

6. The method of claim 1, wherein the access terminal specific request signal includes information pertaining to an identity of the access terminal.

7. The method of claim 1, further comprising transmitting the access terminal specific request signal with a non-zero buffer size even if a buffer associated with the access terminal is empty when request (REQ) based handoff is utilized.

8. The method of claim 1, further comprising transitioning to a confirmation state when the completion signal is detected.

9. The method of claim 1, further comprising returning to a Try to Handoff state upon determining that the timer expired prior to receipt of the forward link confirmation signal.

10. The method of claim 9, further comprising performing reconfirmation when the forward link confirmation signal is not received by transmitting access probes again if handoff was initiated by transmitting access probes or, if handoff was initiated by transmitting either a channel quality indicator (CQI) signal or a request (REQ) signal, continuing to transmit the CQI signal or the REQ signal until confirmation is attained.

11. The method of claim 1, wherein the timer expires at a threshold time duration.

12. The method of claim 1, wherein the forward link confirmation signal is one of a forward link packet or an acknowledgement to a reverse link packet.

13. The method of claim 1, further comprising transmitting a reverse link confirmation signal to the target base station to enable the target base station to recognize at least one of handoff to the target base station has been successful or reentry to connected state from a semi-connected state has been successful.

14. The method of claim 13, wherein the reverse link confirmation signal is one of a reverse link packet or an acknowledgement to a forward link packet.

15. The method of claim 13, wherein the forward link confirmation signal and the reverse link confirmation signal each include more cyclic redundancy check (CRC) bits than the completion signal.

16. An access terminal, comprising:
   a memory that retains instructions related to sending an access terminal specific request signal to a target base station, receiving a completion signal in response to the access terminal specific request signal, wherein the completion signal is one of a reverse link assignment block, a forward link assignment block, or an access grant, initiating a timer upon receiving the completion signal, and confirming transmission of the completion signal from the target base station by identifying whether a forward link confirmation signal is obtained from the target base station prior to an expiration of the timer; and
   a processor, coupled to the memory, configured to execute the instructions retained in the memory.

17. The access terminal of claim 16, wherein the access terminal specific request signal is a handoff request signal.

18. The access terminal of claim 16, wherein the access terminal specific request signal is a reserved signal utilized to re-enter a connected state from a semi-connected state.

19. The access terminal of claim 18, wherein the completion signal is the access grant.

20. The access terminal of claim 16, wherein the access terminal specific request signal includes information pertaining to an identity of the access terminal.

21. The access terminal of claim 16, wherein the memory further retains instructions related to sending the access terminal specific request signal with a non-zero buffer size even if a buffer associated with the access terminal is empty when a request (REQ) based handoff is employed.

22. The access terminal of claim 16, wherein the memory further retains instructions related to switching to a confirmation state when the completion signal is received.

23. The access terminal of claim 16, wherein the memory further retains instructions related to switching to a Try to Handoff state upon determining that the timer expired before obtaining the forward link confirmation signal.

24. The access terminal of claim 23, wherein the memory further retains instructions related to effectuating reconfirmation when the forward link confirmation signal is not received by sending access probes again if handoff was initiated by sending access probes or, if handoff was initiated by sending either a channel quality indicator (CQI) signal or a request (REQ) signal, continuing to send the CQI signal to the REQ signal until confirmation is attained.

25. The access terminal of claim 16, wherein the timer expires at a threshold time duration.

26. The access terminal of claim 16, wherein the forward link confirmation signal is one of a forward link packet or an acknowledgement to a reverse link packet.

27. The access terminal of claim 16, wherein the memory further retains instructions related to sending a reverse link confirmation signal to the target base station to enable the target base station to recognize at least one of handoff to the target base station has been successful or re-entry to connected state from semi-connected state has been successful.

28. The access terminal of claim 27, wherein the reverse link confirmation signal is one of a reverse link packet or an acknowledgement to a forward link packet.

29. The access terminal of claim 27, wherein the forward link confirmation signal and the reverse link confirmation signal each include more cyclic redundancy check (CRC) bits than the completion signal.

30. An access terminal that enables utilizing an error recovery scheme in a wireless communication environment, comprising:
    means for transferring an access terminal specific request signal to a target base station;
    means for initiating a timer when a completion signal is detected, wherein the completion signal is one of a reverse link assignment block, a forward link assignment block, or an access grant; and
    means for confirming transmission of the completion signal from the target base station by determining whether a forward link confirmation signal is obtained before an expiration of the timer.

31. The access terminal of claim 30, further comprising means for transferring the access terminal specific request signal to the target base station to effectuate a handoff from a source base station to the target base station.

32. The access terminal of claim 31, wherein the access terminal specific request signal is a handoff request signal.

33. The access terminal of claim 32, wherein the handoff request signal has a non-zero buffer even if a buffer associated with the access terminal is empty when a request (REQ) based handoff is effectuated.

34. The access terminal of claim 30, further comprising means for transferring the access terminal specific request signal to the target base station to effectuate transitioning from a semi-connected state to a connected state.

35. The access terminal of claim 34, wherein the access terminal specific request signal is a reserved signal and the completion signal is the access grant.

36. The access terminal of claim 30, wherein the timer expires at a threshold time duration that is one of preset or dynamically determined.

37. The access terminal of claim 36, further comprising means for switching to a Try to Handoff state if the forward link confirmation signal is not obtained within the threshold time duration.

38. The access terminal of claim 30, further comprising means for performing reconfirmation when the forward link confirmation signal is not obtained.

39. The access terminal of claim 30, further comprising means for transferring a reverse link confirmation signal to the target base station to enable the target base station to recognize at least one of handoff to the target base station has been successful or re-entry to connected state from semi-connected state has been successful.

40. The access terminal of claim 39, wherein the forward link confirmation signal and the reverse link confirmation signal each include more cyclic redundancy check (CRC) bits than the completion signal.

41. A computer program product, comprising:
    a non-transitory computer-readable medium comprising:
        code for transferring an access terminal specific request signal by an access terminal to a target base station;
        code for initiating a timer at the access terminal when a completion signal is detected, wherein the completion signal is one of a reverse link assignment block, a forward link assignment block, or an access grant; and
        code for confirming transmission of the completion signal from the target base station at the access terminal by determining whether a forward link confirmation signal is obtained by the access terminal before an expiration of the timer.

42. The computer program product of claim 41, wherein the computer-readable medium further comprises code for transferring the access terminal specific request signal to the target base station to effectuate a handoff from a source base station to the target base station.

43. The computer program product of claim 41, wherein the computer-readable medium further comprises code for transferring the access terminal specific request signal to the target base station to effectuate transitioning from a semi-connected state to a connected state.

44. The computer program product of claim 41, wherein the computer-readable medium further comprises code for returning to a Try to Handoff state upon determining that the timer expired before obtaining the forward link confirmation signal.

45. The computer program product of claim 41, wherein the timer expires at a threshold time duration that is one of preset or dynamically determined.

46. The computer program product of claim 41, wherein the computer-readable medium further comprises code for transferring a reverse link confirmation signal to the target base station to enable the target base station to recognize at least one of handoff to the target base station has been successful or re-entry to a connected state from a semi-connected state has been successful.

47. The computer program product of claim 46, wherein the forward link confirmation signal and the reverse link confirmation signal each include more cyclic redundancy check (CRC) bits than the completion signal.

48. In a wireless communications system, an access terminal comprising: a processor configured to:
    transmit an access terminal specific request signal to a target base station;
    detect a completion signal in response to the access terminal specific request signal, wherein the completion signal is one of a reverse link assignment block, a forward link assignment block, or an access grant;
    start a timer upon detecting the completion signal; and
    confirm transmission of the completion signal from the target base station by determining whether a forward link confirmation signal is received from the target base station prior to an expiration of the timer.

49. A method at a base station that facilitates recovering from false completion signal detection in a wireless communication environment, comprising:
    receiving an access terminal specific request signal from an access terminal;
    transmitting a completion signal to the access terminal in response to the access terminal specific request signal, the completion signal indicates resources assigned to the access terminal, wherein the completion signal is one of a reverse link assignment block, a forward link assignment block, or an access grant; and transmitting a forward link confirmation signal to the access terminal, wherein the forward link confirmation signal enables the access terminal to confirm receipt of the completion signal prior to expiration of a timer of the access terminal.

50. The method of claim 49, wherein the access terminal specific request signal is one of a handoff request signal or a reserved signal utilized by the access terminal to exit semi-connected state.

51. The method of claim 49, further comprising analyzing the access terminal specific request signal to determine at least one of an identity of the access terminal or a context associated with the access terminal.

52. The method of claim 49, further comprising allocating non-zero amounts of resources to the access terminal.

53. The method of claim 49, further comprising transitioning to a confirmation state upon transmitting the completion signal to the access terminal.

54. The method of claim 49, wherein the forward link confirmation signal is one of a forward link assignment block or an acknowledgement (ACK) to a reverse link packet.

55. The method of claim 49, further comprising transmitting the completion signal to the access terminal irrespective of buffer data being included in the access terminal specific request signal.

56. The method of claim 49, further comprising:
receiving a reverse link confirmation signal from the access terminal; and
recognizing at least one of handoff for the access terminal has completed or the access terminal has returned to connected state from semi-connected state upon receiving the reverse link confirmation signal.

57. The method of claim 49, further comprising:
receiving a backhaul message that indicates a disparate base station serves the access terminal; and
transitioning to a Non-Serving state from at least one of a Serving state or a Confirm Handoff state upon receiving the backhaul message.

58. A wireless communications base station, comprising:
a memory that retains instructions related to obtaining an access terminal specific request signal from an access terminal, sending a completion signal to the access terminal in response to the access terminal specific request signal, the completion signal is one of a reverse link assignment block, a forward link assignment block, or an access grant, and sending a forward link confirmation signal to the access terminal, wherein the forward link confirmation signal enables the access terminal to confirm receipt of the completion signal prior to expiration of a timer of the access terminal; and
a processor, coupled to the memory, configured to execute the instructions retained in the memory.

59. The wireless communications base station of claim 58, wherein the access terminal specific request signal is one of a handoff request signal or a reserved signal utilized by the access terminal to exit semi-connected state.

60. The wireless communications base station of claim 58, wherein the memory further retains instructions related to analyzing the access terminal specific request signal to determine at least one of an identity of the access terminal or a context associated with the access terminal.

61. The wireless communications base station of claim 58, wherein the memory further retains instruction related to transitioning to a confirmation state upon transmitting the completion signal to the access terminal.

62. The wireless communications base station of claim 58, wherein the forward link confirmation signal is one of a forward link assignment block or an acknowledgement (ACK) to a reverse link packet.

63. The wireless communications base station of claim 58, wherein the memory further retains instructions related to sending the completion signal to the access terminal irrespective of buffer data being included in the access terminal specific request signal.

64. The wireless communications base station of claim 58, wherein the memory further retains instruction related to recognizing at least one of handoff for the access terminal has completed or the access terminal has returned to a connected state from a semi-connected state upon detecting a reverse link confirmation signal.

65. The wireless communications base station of claim 58, wherein the memory further retains instruction related to transitioning to a Non-Serving state from at least one of a Serving state or a Confirm Handoff state upon receiving a backhaul message that indicates a disparate base station serves the access terminal.

66. A wireless communications base station that enables mitigating error associated with false completion signal detection in a wireless communication environment, comprising:
means for analyzing an obtained request signal specific to an access terminal;
means for sending a completion signal to the access terminal based upon the request Signal specific to the access terminal, wherein the completion signal is one of a reverse link assignment block, a forward link assignment block, or an access grant; and
means for transmitting a forward link confirmation signal to the access terminal that allows the access terminal to confirm receipt of the completion signal prior to expiration of a timer of the access terminal.

67. The wireless communications base station of claim 66, wherein the request signal to the access terminal is one of a handoff request signal or a reserved signal utilized by the access terminal to exit semi-connected state.

68. The wireless communications base station of claim 66, further comprising means for determining at least one of an identity of the access terminal or a context corresponding to the access terminal based upon analyzing the request signal specific to the access terminal.

69. The wireless communications base station of claim 66, further comprising means for transitioning to a confirmation state upon sending the completion signal to the access terminal.

70. The wireless communications base station of claim 66, wherein the forward link confirmation signal is one of a forward link assignment block or an acknowledgement (ACK) to a reverse link packet.

71. The wireless communications base station of claim 66, further comprising means for sending the completion signal to the access terminal irrespective of buffer data being included in the request signal specific to the access terminal.

72. The wireless communications base station of claim 66, further comprising means for recognizing at least one of handoff for the access terminal has completed or the access terminal has returned to connected state from semi-connected state upon detecting a reverse link confirmation signal from the access terminal.

73. The wireless communications base station of claim 66, further comprising means for switching to a Non-Serving state from at least one of a Serving state or a Confirm Handoff state upon receiving a backhaul message that indicates a disparate base station serves the access terminal.

74. A computer program product, comprising: a non-transitory computer-readable medium comprising:
   code for evaluating an obtained request signal specific to an access terminal by a target base station;
   code for transferring a completion signal to the access terminal by the target base station based upon the request signal specific to the access terminal, the completion signal is one of a reverse link assignment block, a forward link assignment block, or an access grant; and
   code for transferring a forward link confirmation signal by the target base station to the access terminal that allows the access terminal to confirm receipt of the completion signal prior to expiration of a timer of the access terminal.

75. The computer program product of claim 74, wherein the request signal specific to the access terminal is one of a handoff request signal employed by the access terminal to handoff from a source base station or a reserved signal utilized by the access terminal to exit a semi-connected state.

76. The computer program product of claim 74, wherein the computer-readable medium further comprises code for determining at least one of an identity of the access terminal or a context corresponding to the access terminal based upon analyzing the request signal specific to the access terminal.

77. The computer program product of claim 74, wherein the computer-readable medium further comprises code for transitioning to a confirmation state upon transferring the completion signal to the access terminal.

78. The computer program product of claim 74, wherein the forward link confirmation signal is one of a forward link assignment block or an acknowledgement (ACK) to a reverse link packet.

79. The computer program product of claim 74, wherein the computer-readable medium further comprises code for transferring the completion signal to the access terminal irrespective of buffer data being included in the request signal.

80. The computer program product of claim 74, wherein the computer-readable medium further comprises code for recognizing at least one of handoff for the access terminal has completed or the access terminal has returned to a connected state from a semi-connected state upon detecting a reverse link confirmation signal from the access terminal.

81. The computer program product of claim 74, wherein the computer-readable medium further comprises code for transitioning to a Non-Serving state from at least one of a Serving state or a Confirm Handoff state upon receiving a backhaul message that indicates a disparate base station serves the access terminal.

82. In a wireless communications system, a base station comprising:
   a processor configured to:
      receive an access terminal specific request signal from an access terminal;
      transmit a completion signal to the access terminal in response to the access terminal specific request signal, the completion signal is one of a reverse link assignment block, a forward link assignment block, or an access grant; and
      transmit a forward link confirmation signal to the access terminal, wherein the forward link confirmation signal enables the access terminal to confirm receipt of the completion signal prior to expiration of a timer of the access terminal.

* * * * *